United States Patent
Hupp et al.

(10) Patent No.: US 9,300,595 B2
(45) Date of Patent: Mar. 29, 2016

(54) METHOD FOR NETWORK ORGANIZATION

(75) Inventors: Juergen Hupp, Nuremberg (DE);
Thomas Windisch, Neuhaus (DE);
Christian Fluegel, Nuremberg (DE)

(73) Assignee: Fraunhofer-Gesellschaft zur Foerderung der angewandten forschung e.V., Munich (DE)

( * ) Notice: Subject to any disclaimer, the term of this patent is extended or adjusted under 35 U.S.C. 154(b) by 138 days.

(21) Appl. No.: 13/588,189

(22) Filed: Aug. 17, 2012

(65) Prior Publication Data
US 2013/0215909 A1 Aug. 22, 2013

(30) Foreign Application Priority Data
Aug. 19, 2011 (DE) .................. 10 2011 081 269

(51) Int. Cl.
| H04L 12/28 | (2006.01) |
| H04L 12/911 | (2013.01) |
| H04W 74/08 | (2009.01) |
| H04J 1/16 | (2006.01) |
| H04W 84/18 | (2009.01) |
| H04W 56/00 | (2009.01) |

(52) U.S. Cl.
CPC ......... H04L 47/826 (2013.01); H04W 74/0841 (2013.01); *H04W 56/001* (2013.01); *H04W 84/18* (2013.01)

(58) Field of Classification Search
USPC ................... 370/256, 337, 442, 386
See application file for complete search history.

(56) References Cited

U.S. PATENT DOCUMENTS

| 4,504,946 | A | * | 3/1985 | Raychaudhuri ............... 370/322 |
| 5,020,054 | A | * | 5/1991 | May, Jr. ................. H04L 1/004 370/474 |
| 6,608,821 | B1 | * | 8/2003 | Gendel ......................... 370/280 |
| 6,738,364 | B1 | * | 5/2004 | Saunders ...................... 370/332 |
| 6,859,445 | B1 | * | 2/2005 | Moon et al. ................... 370/335 |
| 6,907,044 | B1 | * | 6/2005 | Yonge et al. .................. 370/445 |
| 7,123,593 | B1 | * | 10/2006 | Marque-Pucheu et al. ... 370/324 |
| 7,379,863 | B2 | * | 5/2008 | Delfs et al. .................... 704/201 |

(Continued)

FOREIGN PATENT DOCUMENTS

| DE | 10 2009 041 834 A1 | 3/2011 |
| EP | 1815650 B1 | 3/2009 |

(Continued)

OTHER PUBLICATIONS

Official Communication issued in corresponding European Patent Application No. 12180728.3, mailed on Dec. 12, 2012.

(Continued)

*Primary Examiner* — John Pezzlo
(74) *Attorney, Agent, or Firm* — Keating & Bennett, LLP

(57) ABSTRACT

A transmitter for sending data packets over a time-multiplexed channel includes a time slot selector for selecting a time slot for transmitting a data packet; and a data packet position selector for selecting a data packet time position within the selected time slot, wherein the data packet time position is selected anew for at least every $i^{th}$ data packet. The transmitter is configured for transmitting the data packet in the selected time slot and the selected data packet position within the selected time slot. A method for transmitting data packet is also disclosed. Furthermore, a receiver, a method for receiving data packets and a computer program are additionally described.

23 Claims, 14 Drawing Sheets

(56) References Cited

U.S. PATENT DOCUMENTS

| | | | |
|---|---|---|---|
| 8,305,972 B2* | 11/2012 | Baker et al. | 370/329 |
| 2002/0067736 A1* | 6/2002 | Garcia-Luna-Aceves | H04W 72/1257 370/442 |
| 2002/0141435 A1* | 10/2002 | Newberg et al. | 370/442 |
| 2008/0165761 A1 | 7/2008 | Goppner et al. | |
| 2009/0005058 A1* | 1/2009 | Kazmi et al. | 455/452.1 |
| 2009/0040973 A1* | 2/2009 | Iwai et al. | 370/329 |
| 2009/0323716 A1* | 12/2009 | Chintalapudi et al. | 370/461 |
| 2010/0034159 A1* | 2/2010 | Shin et al. | 370/329 |
| 2011/0149922 A1 | 6/2011 | Soliman et al. | |
| 2013/0022083 A1* | 1/2013 | Vasseur et al. | 375/132 |

FOREIGN PATENT DOCUMENTS

| | | |
|---|---|---|
| EP | 2 124 501 A1 | 11/2009 |
| WO | 2010/081895 A1 | 7/2010 |
| WO | 2011/033081 A1 | 3/2011 |

OTHER PUBLICATIONS

Walter et al., "New Concepts for a Decentralized, Self-Organizing Air-to-Air Radio Link." IEEE AIAA 29th Digital Avionics Systems Conference, Oct. 3, 2010, pp. 3.D.1-1 to 3.D.1-12.

Official Communication issued in corresponding European Patent Application No. 12180728.3, mailed on Mar. 25, 2013.

Simeone et al., "Spectrum Leasing to Cooperating Secondary Ad Hoc Networks," IEEE Journal on Selected Areas in Communications, vol. 26, No. 1, Jan. 2008, pp. 203-213.

Laneman et al., "Distributed Space-Time-Coded Protocols for Exploiting Cooperative Diveristy in Wireless Networks," IEEE Transactions on Information Theory, vol. 49, No. 10, Oct. 2003, pp. 2415-2425.

Lee et al., "Combined Random/Reservation Access for Packet Switched Transmission Over a Satellite with On-Board Processing: Part I-Global Beam Satellite", IEEE Transactions on Communications, vol. Com 31, No. 10, Oct. 1983 pp. 1161-1171.

* cited by examiner

METHOD FOR NETWORK ORGANIZATION

The present invention relates to transmitters and receivers for transmitting data packets over a time-multiplexed channel, a method for transmitting data packets, a method for receiving data packets and a corresponding computer program. The present invention relates in particular to measures for ameliorating the effects of collisions of data packets sent by different transmitters over the time-multiplexed channel during the same time slot.

BACKGROUND OF THE INVENTION

Transmission or exchange of data, i.e., information is a frequent requirement in many areas. For example, it may be desirable to collect measured values relating to physical variables from a variety of measuring points, which are distributed in space. In addition to the possibility of connecting the individual sensors at the measuring points by means of cables to a central data collecting device, radio-based approaches have become increasingly important, mainly for reasons of cost and flexibility. Some types of such devices are referred to as sensor networks, among other things. A sensor network is a system of spatially distributed sensor nodes, which interact independently with one another and also with the existing infrastructure by radio—depending on the application. This serves to acquire, process, forward and supply information and/or data from the physical world. Sensor networks may differ in the type of networking, the topology and the direction of data flow, for example.

FIG. 1 shows as an example a schematic topological view of a wireless sensor network 1. The sensor network 1 comprises sensor nodes 4, anchor nodes and/or router nodes 5 and, in the example shown here, a network transfer, i.e., gateway node 6. The sensor network 1 is connected to a main network, i.e., a backbone network 2 via the gateway node 6. An analysis system may also be connected as a back-end system 3 to the backbone network 2.

In general, the topology of a sensor network cannot be determined in advance and/or may change during operation. One possibility of responding to the variability of the topology of the sensor network consists of leaving the organization of the communication, i.e., the network topology to the nodes forming the network. The communication, i.e., the network topology is then organized automatically by the network. Especially in the case of radio-based sensor networks but also with other transmission technologies that are used, it may happen that a transmitter does not have enough range to be able to reliably send the data to be transmitted to a receiver, which is at a distance spatially from the transmitter. In this case, it may be provided that, with many network topologies, the data packets are forwarded to the receiver via intermediate nodes (multi-hop communication). A receiver therefore need not be in direct (radio) range of the original transmitter.

In many applications, the sensor nodes are usually battery operated, so wireless communication is a special challenge. Depending on the application, the requirements with regard to the allowed latency, the data rate that may be used, the number of nodes and the desired topology may be elucidated and weighed against the available energy.

There are the following main reasons for electric power consumption in communication:

"Idle listening" (ready-to-receive status): a node has activated the receiver and is listening for nonexistent messages that might be sent. This is usually one of the main sources or causes of electric power consumption.

"Overhearing": a node receives messages not intended for it.

"Collisions": two packets sent simultaneously are destructively superimposed at the receiver and may be repeated.

"Control overhead" (expenditure for control and/or coordination): the protocol header information involves additional time for its transmission and thus consumes energy.

Because of the limited energy, especially in battery-operated devices, some protocols for multi-hop communication in wireless sensor networks attempt to coordinate their transmission and receiving processes to thereby achieve the shortest possible activity cycles.

A number of protocols have introduced a timing coordination through a central instance (master) in the system. Examples of this include IEEE 802.15.4 in the so-called beacon mode or the s-net protocol of the Fraunhofer Institute for Integrated Circuits, which is also described in the European Patent EP 1 815 650 B1.

FIG. 2 shows schematically a network structure of the sensor network 1 and is cited to illustrate an example of tree-type propagation of a synchronization signal and/or a coordination signal in the sensor network 1. The sensor network 1 is structured according to a self-organizing tree topology. As mentioned above, a timing synchronization may be used to enable an energy-saving communication. For the timing synchronization, the synchronization nodes will periodically transmit beacon signals. The nodes are organized independently along a tree structure. Except for the master node 7, each node has a parent node and may either have no child node, one child node or multiple child nodes. Dynamic adjustments in network structure may occur in particular when there are changes in the spatial position and/or the transmission conditions between two or more nodes.

The main node, i.e., master node 7 belongs to a layer group 0 and periodically transmits a beacon signal. For example, the master node 7 may be defined as the master node on the basis of a configuration by the user or the network administrator of the sensor network 1. Another possibility is for the master node 7 to be the first node activated within the sensor network 1, for example, and thus transmitted first as a beacon signal. In the example illustrated in FIG. 2, there are six additional nodes within the reception range of the master node 7, namely the end node and/or sensor nodes 4 with the node identification numbers 1, 18 and 20 indicated within the circles as well as the anchor nodes 5 with the node identification numbers 2, 4 and 5. The six above-mentioned nodes with the node identification numbers 1, 2, 4, 5, 18 and 20 belong to a layer group 1 because they are capable of receiving the beacon signal directly from the master node 7. The beacon signal of the master node 7 contains at least one item of information that was sent from a node of the layer group 0. The anchor nodes 5 with the node identification numbers 2, 4 and 5 then in turn emit beacon signals but they are typically offset in time in relation to the beacon signal of the master node 7. The beacon signal emitted by the anchor node having the node identification number 2 is received by the anchor node having the node identification numbers 3 and 6, for example, which are thus assigned to the layer group 2. The beacon signal of the anchor node having the node identification number 4 is received by two other anchor nodes having the node identification numbers 8 and 12; the data signal emitted by the anchor node having the node identification number 5 is received by the end nodes having the node identification numbers 13 and 14. As a representative example, the anchor node having the node identification number 7 will now be considered. The anchor node having the node identification number 7 is within the range of the anchor node having the node identification number 3 and belongs to the layer group 3. Since another external end node having the node identification number 17 is also within the reception area of a node having the node identification number 7, the node no. 17 is assigned to the layer group 4 and the node no. 7 is a parent node for the node no. 17.

FIG. 2 thus shows that the master node 7 (node no. 0) transmits its information and/or synchronization signals as nodes of the layer 0. These signals are received by the node of the layer 1, which in turn send their information and/or synchronization signals as nodes to the layer 1. These signals are received by nodes of the layer 2, etc. A frame structure having time slots for the (periodic) send/receive activities of the individual nodes is often defined for sending the information and/or synchronization signals. If two nodes whose signals can both be received by a third node are using the time slot for sending, a collision may occur at the third node, so that the third node cannot reliably receive either of the two signals that are sent.

It would be desirable if the effects of such a situation were less serious for the third node, which does not have an opportunity to participate in the communication with the sensor network 1 because it does not have an opportunity for synchronization with the remaining network. Alternatively or additionally, it would also be desirable for the situation described above to be detectable and correctable, if possible.

SUMMARY

According to an embodiment, a transmitter for sending data packets over a time-multiplexed channel may have: a time slot selector for selecting a time slot for sending a data packet; and data packet position selector for selecting a data packet time position within the selected time slot, wherein the data packet time position is selected anew for at least every $i^{th}$ data packet; wherein the transmitter is configured for sending the data packet in the selected time slot and at the selected data packet position within the selected time slot.

According to another embodiment, a receiver for receiving data packets over a time-multiplexed channel may have: a time slot analyzer for checking on whether during a time slot of a current frame or during at least one corresponding time slot of a preceding frame, data packets from more than one transmitter have been received, wherein the time slot and the at least one corresponding time slot of the at least one preceding frame are subdivided, so that a data packet within the time slot or the corresponding time slot may be present at one of at least two different data packet time positions; a time slot information generator for generating time slot information indicating whether the time slot or the corresponding time slot of at least one of the preceding frames includes data packets from more than one transmitter; a time slot information transmitter for transmitting the time slot information.

According to another embodiment, a method for sending data packets over a time-multiplexed channel may have the steps of: selecting a time slot for sending a data packet; selecting a data packet time position within the selected time slot, wherein the data packet time position is selected anew for at least every $i^{th}$ data packet to be sent; and sending the data packet during the selected time slot and at the selected data packet time position within the selected time slot.

According to another embodiment, a method for receiving data packets over a time-multiplexed channel may have the steps of: receiving a data packet during a time slot which has been assigned to a transmitter sending the data packet, wherein the time slot is subdivided, so that a data packet within the time slot may occur at one of at least two different data packet time positions; checking on whether a data packet was received within the time slot or within a corresponding time slot of at least one preceding frame, said packet having been sent by a different transmitter than the current data packet; transmitting time slot information if the transmitter sending the current data packet and the at least one other transmitter are using the same time slot, or the same corresponding time slot is being used by the at least one preceding frame for sending data packets.

Another embodiment may have a computer program having a program code for implementing the method for sending data packets over a time-multiplexed channel, which method may have the steps of: selecting a time slot for sending a data packet; selecting a data packet time position within the selected time slot, wherein the data packet time position is selected anew for at least every $i^{th}$ data packet to be sent; and sending the data packet during the selected time slot and at the selected data packet time position within the selected time slot, when the computer program is running on a computer, a microcontroller or a microprocessor.

Another embodiment may have a computer program having a program code for implementing the method for receiving data packets over a time-multiplexed channel, which method may have the steps of: receiving a data packet during a time slot which has been assigned to a transmitter sending the data packet, wherein the time slot is subdivided, so that a data packet within the time slot may occur at one of at least two different data packet time positions; checking on whether a data packet was received within the time slot or within a corresponding time slot of at least one preceding frame, said packet having been sent by a different transmitter than the current data packet; transmitting time slot information if the transmitter sending the current data packet and the at least one other transmitter are using the same time slot, or the same corresponding time slot is being used by the at least one preceding frame for sending data packets, when the computer program is running on a computer, a microcontroller or a microprocessor.

Embodiments of the technical teaching disclosed here relate to a transmitter for sending data packets over a time-multiplexed channel. The transmitter comprises a time slot selector for selecting a time slot for sending a data packet and a data packet position selector for selecting a data packet time position within the selected time slot, wherein the data packet time position is selected anew for at least every $i^{th}$ data packet. The transmitter is configured by transmitting the data packet in the selected time slot and at the selected data packet time position within the selected time slot.

Additional embodiments of the technical teaching disclosed here provide a receiver for receiving data packets over a time-multiplexed channel. The receiver comprises a time slot analyzer for checking on whether data packets have been received from more than one transmitter during a time slot of a current frame or during at least one corresponding time slot of a preceding frame. The time slot and the at least one corresponding time slot of the at least one preceding frame are subdivided, so that a data packet within the time slot or within the corresponding time slot may be present at one of at least two different data packet time positions. The receiver also comprises a time slot information generator for generating time slot information, which indicates whether the time slot or the corresponding time slot of at least one of the preceding frames is receiving data packets from more than one transmitter, and it also comprises a time slot information sending device for sending the time slot information.

In embodiments of the disclosed technical teaching, a method for sending data packets over a time-multiplexed channel is made available. This method comprises selecting a time slot for sending a data packet, selecting a data packet time position within the selected time slot, wherein the data packet time position is newly selected for at least every $i^{th}$ data packet to be sent, and the method also comprises sending the data packet during the selected time slot and at the selected data packet time position within the selected time slot.

Additional embodiments of the disclosed technical teaching make available a method for receiving data packets over a time-multiplexed channel. This method comprises receiving a data packet, which is assigned to the transmitter sending the data packet, during a time slot, said time slot being subdivided, so that a data packet within the time slot may occur at one of at least two different data packet time positions. This method also includes checking on whether a data packet, which was sent from a different transmitter than the current data packet, has been received within the time slot or a corresponding time slot of at least one preceding frame. Furthermore, the method comprises sending time slot information if the transmitter sending the current data packet and the at least one other transmitter are using the same time slot, or the same corresponding time slot is being used by the at least one preceding frame for sending data packets.

The technical teaching disclosed herein reduces the risk of repeated permanent collisions of data transmission of two different transmitters within a time slot. In particular, the point in time within a time slot for the data transmission by a transmitter may vary from one time to the next, so that a different transmitter using the same time slot can transmit at a different point in time within the time slot, resulting at least in the signal from one of the two transmitters being receivable and analyzable by the receiver. The technical teaching disclosed here thus provides a method by which double and/or multiple movements of a time slot within the network as well as the so-called sliding collisions of independent networks can be detected and so that in particular total permanent radio failures do not occur.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
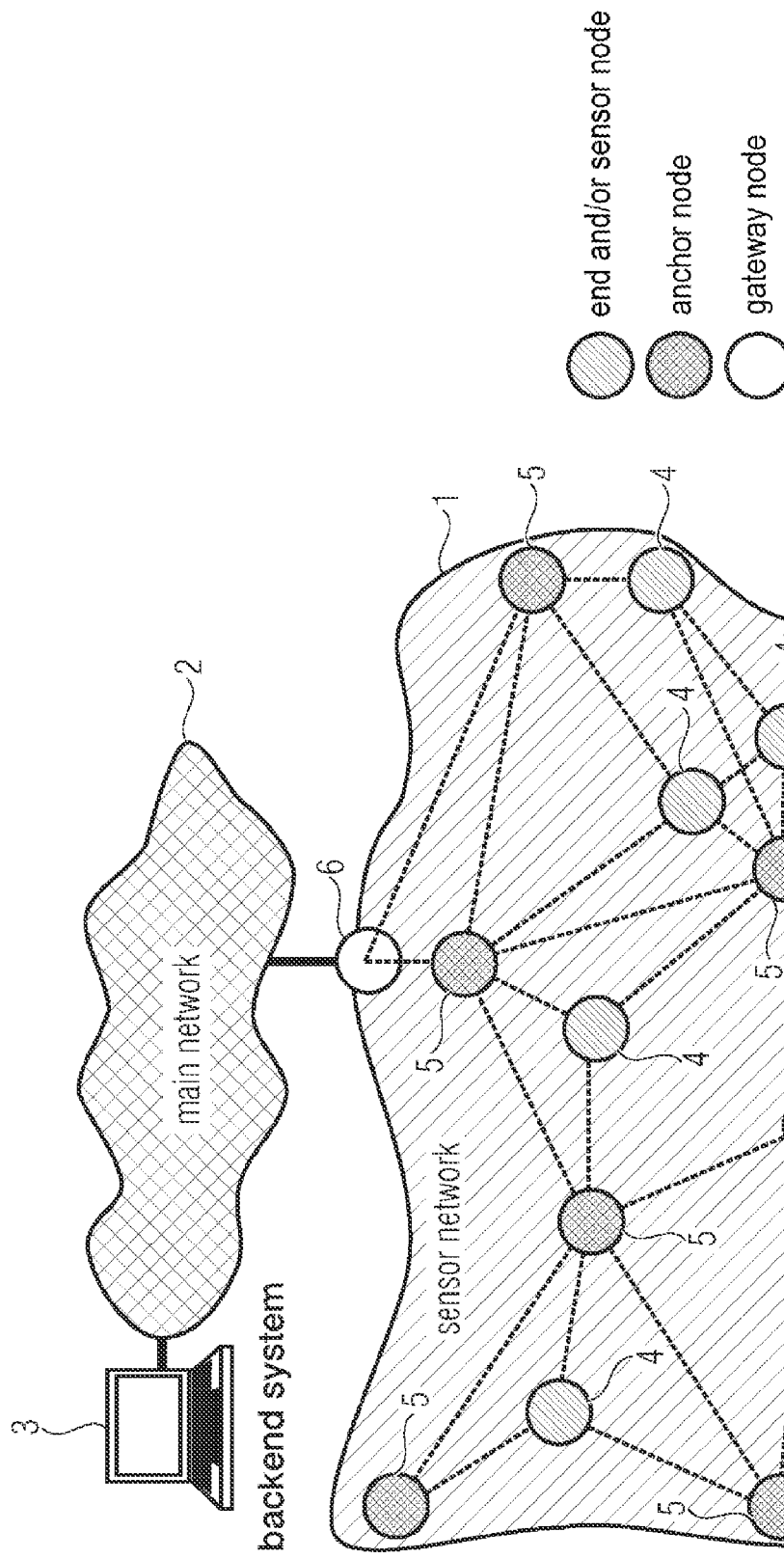
FIG. 1 shows a schematic network diagram of a sensor network having a connected backbone network and a back-end system.

Before discussing the technical teaching disclosed herein in detail below on the basis of the drawings, it should first be pointed out that identical elements or those having the same or similar functions in the figures are labeled with the same or similar reference numerals so that the description of the elements in the various embodiments can be interchangeable and/or can be applied mutually.

Figure 2:
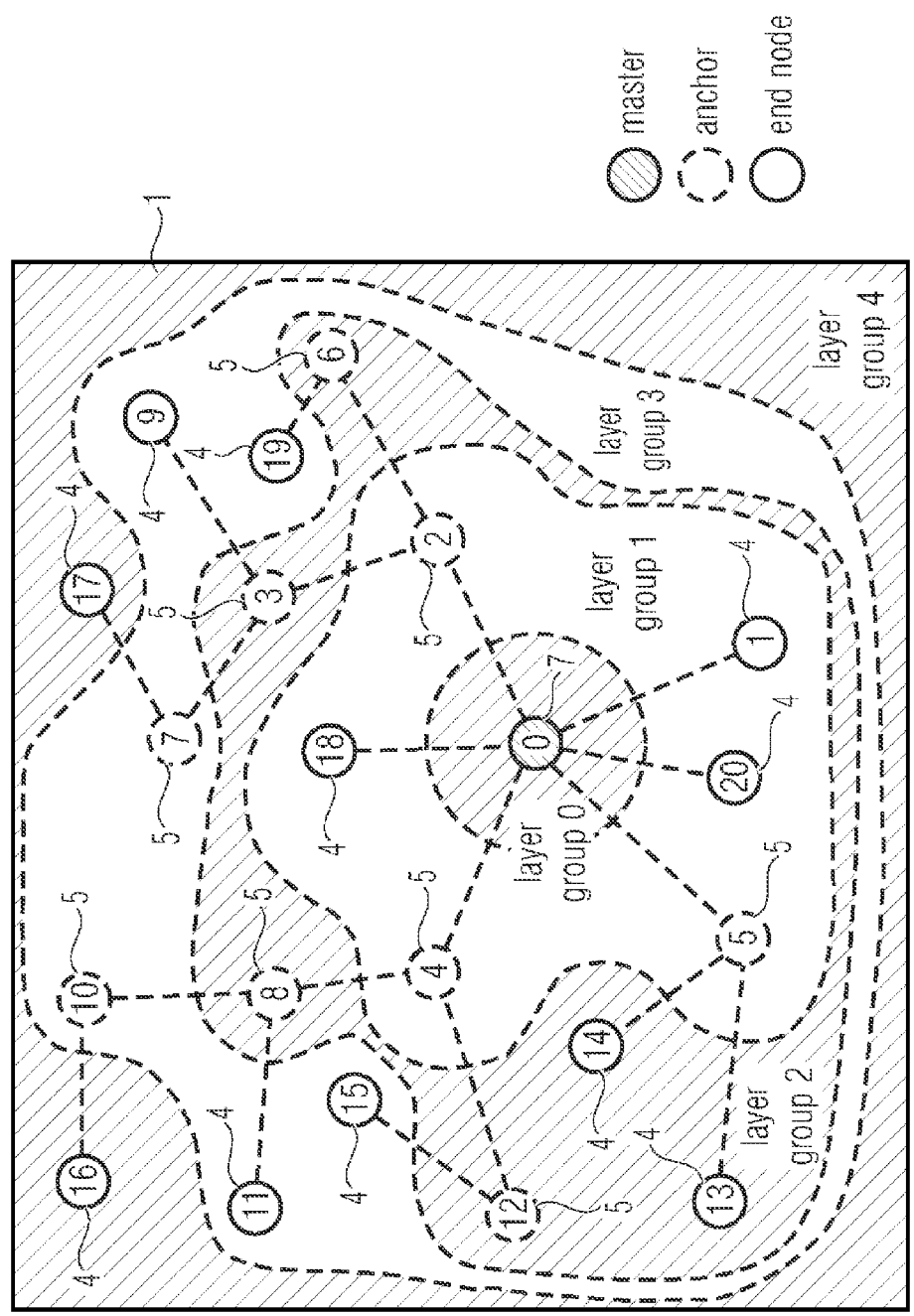
FIG. 2 shows a schematic network diagram as an example of a tree-type propagation of a synchronization signal and/or a coordination signal.

The technical teaching disclosed herein describes devices and methods which may be used for communication between the nodes of a sensor network 1 (see FIG. 1). To minimize the configuration complexity for a user or administrator of a sensor network and/or to permit a flexible adjustment of the sensor network to the changing network topology, a decentralized organizational method (self-organization method) is implemented in some sensor network architectures, in which a node automatically selects the time slot for its own transmission from the information (e.g., occupancy information) it has received from its precursors and/or from its neighboring nodes. In addition, it has opportunities for analyzing the received signal strength (RSSI scanning options; RSSI=received signal strength indication), in that the node listens in on the radio channel and detects any signal strength that might be present. For example, separate time slots can be defined for each of the individual layers shown in FIG. 2. Nodes on the same layer would thus use only the time slots that are provided for this layer accordingly.

Figure 3:
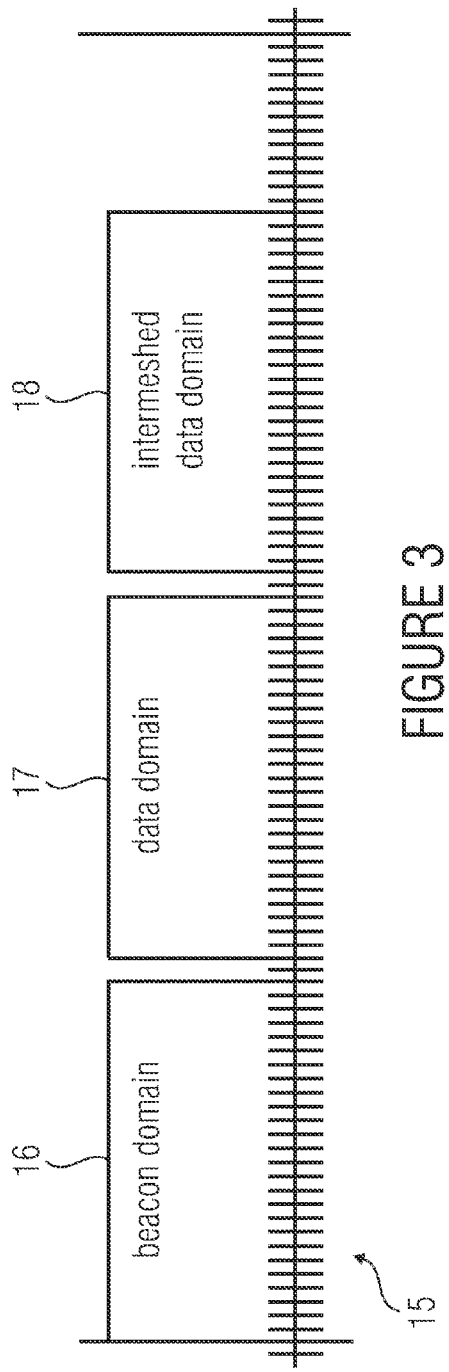
FIG. 3 shows a schematic diagram of a frame structure, i.e., a "frame," which can be used for communication in the sensor network.

FIG. 3 shows schematically a frame structure 15 for timing synchronization of the network. By synchronization, very short activity cycles may be achieved for the transmission and reception processes. Since transmission and reception typically constitute the highest energy consumption by the nodes, great energy savings can be achieved by short activity cycles. As already explained in conjunction with FIG. 2, the timing synchronization is sent from the master node 7 (having the node identification number 0 in FIG. 2). To do so, the master node 7 sends protocol control packets to which the surrounding nodes synchronize themselves on reception. Nodes receiving the signal directly from the master node 7 form the layer group 1. Each node in the layer group 1 in turn sends synchronization packets to which the nodes of the layer group 2 that have received the synchronization packets are synchronized, etc. This then leads to a synchronized and networked tree structure. The end of one branch is reached at an end node 4. This type of node typically does not transmit a beacon signal, or a beacon signal transmitted by it is not received by a node that is not already assigned to a layer group.

The end nodes 4 are typically the sensor nodes of the sensor network 1. However, it is also possible for the anchor nodes 5 and/or the gateway nodes 6 to have a sensor functionality.

The quality of the network connection can be monitored (continuously) and the network topology may be adjusted dynamically if need be. In this case, a node selects another precursor and/or parent node for receiving the synchronization packet if the synchronization signal sent from this parent node to other parent nodes is received better than from the parent nodes used previously.

Data communication between nodes is typically bidirectional. Typically the same communication paths as those resulting from synchronization are advantaegously used for the data communication for transmission of useful data. This then typically leads to the formation of a tree structure, which can also be used with regard to the transmission of useful data within the sensor network 1.

In addition, with many types of sensors, data can also be exchanged among the nodes, which are mutually situated within the respective transmitter ranges. This data transfer within a network mesh (meshed, or intermeshed, data transfer) may be independent of the synchronization topology and the layer group. It is therefore also utilized by many network protocols to obtain information from the surrounding environment. In this way, a node can collect information about its radio neighbour s.

For the timing synchronization, all the nodes can follow a periodic frame 15. One frame 15 comprises several active regions, so-called domains. Each domain fulfills a typical task. For example, a protocol may comprise the following three domains:

Beacon domain 16: A time domain for sending and receiving synchronization packets and for data communication in the direction of the end nodes. The beacon range serves to synchronize the nodes in time with the exact beginning of the frame 15, which is initiated by the master 17 and begins at the same time for all nodes.

Data domain 17: Time domain for sending and receiving data packets in the direction of the master node 7.

Meshed data domain 18: Time domain for sending and receiving data within the radio cell of a node and for extracting information from the surrounding environment.

A domain is further subdivided into time ranges for layer groups. The individual layers are synchronized to function without a collision in this way. Each layer group is in turn subdivided into multiple send/receive time slots.

Figure 4:
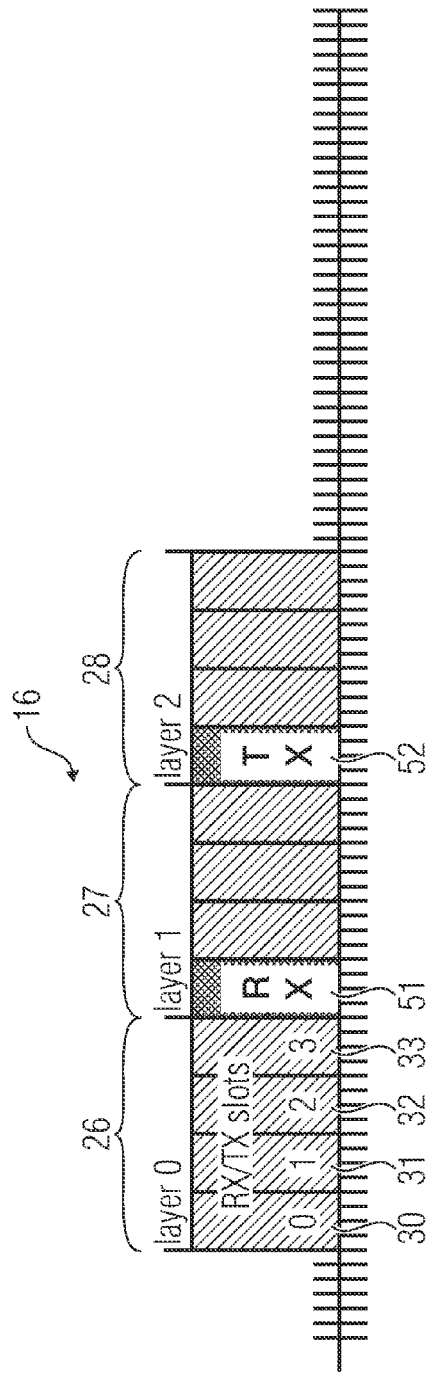
FIG. 4 shows a schematic example of the allocation of a detail of the frame structure from FIG. 3.

FIG. 4 shows a possible beacon domain 16 as one example: three layer groups 26, 27 and 28 are defined, each having four send/receive time slots. For example, the layer group 26 for the layer 0 has the four send/receive time slots 30, 31, 32, 33. The master node 7 selects an unallocated send/receive time slot in the layer group 0 (reference numeral 26) for sending its synchronization packet. A subsequent node, e.g., node no. 2 in FIG. 2, receives this packet and in turn sends a synchronization packet in a time slot of the time range 27, which is provided for the layer group 1. FIG. 4 illustrates the situation for an anchor node of the layer group 2 which receives the synchronization packet 51 transmitted by the node of the layer group 1, e.g., during the first time slot of the time range 27 for the layer group 1. This node of the layer group 2 then in turn sends a synchronization packet 52 in a time slot of the time range 28 for the layer group 2.

The length of a frame and the number of layer groups and of send/receive time slots can be configured according to the requirements of the application.

Figure 5:
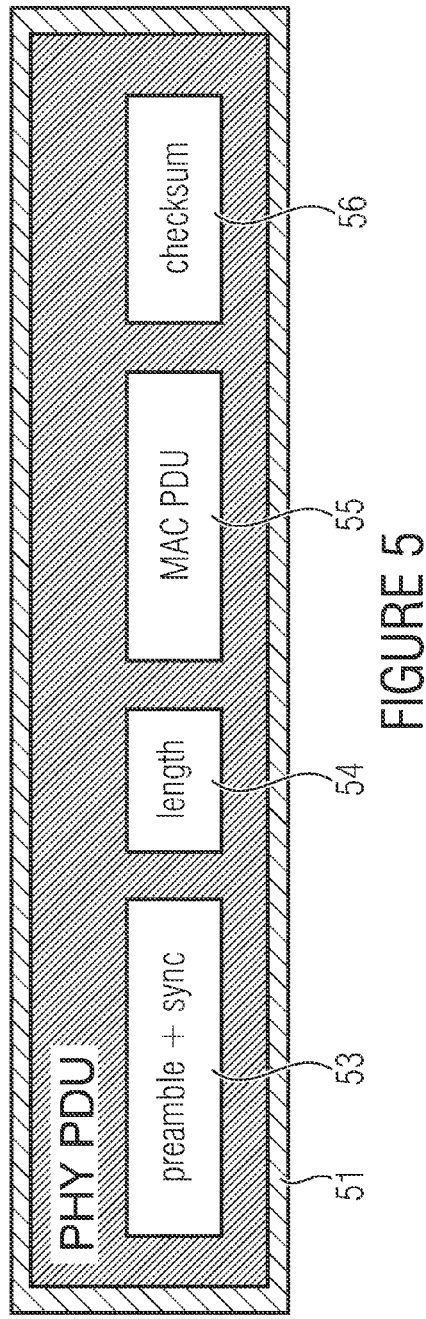
FIG. 5 shows a schematic diagram of a data packet, which is used for communication within the sensor network.

FIG. 5 shows schematically the layout of a data packet of the physical layer of the OSI layer model. The physical layer (PHY) represents the lowest protocol layer directly above the physical radio device (sender/receiver, i.e., transceiver). The data packet shown here may be data packet 51 from FIG. 4, for example, or it may be another data packet sent by one of the network nodes. Data packet 51 comprises a preamble field and synchronization field 53, a length specification field 54, a protocol data unit (PDU) 55 of a media access control layer (MAC) and a checksum field 56.

Figure 6:
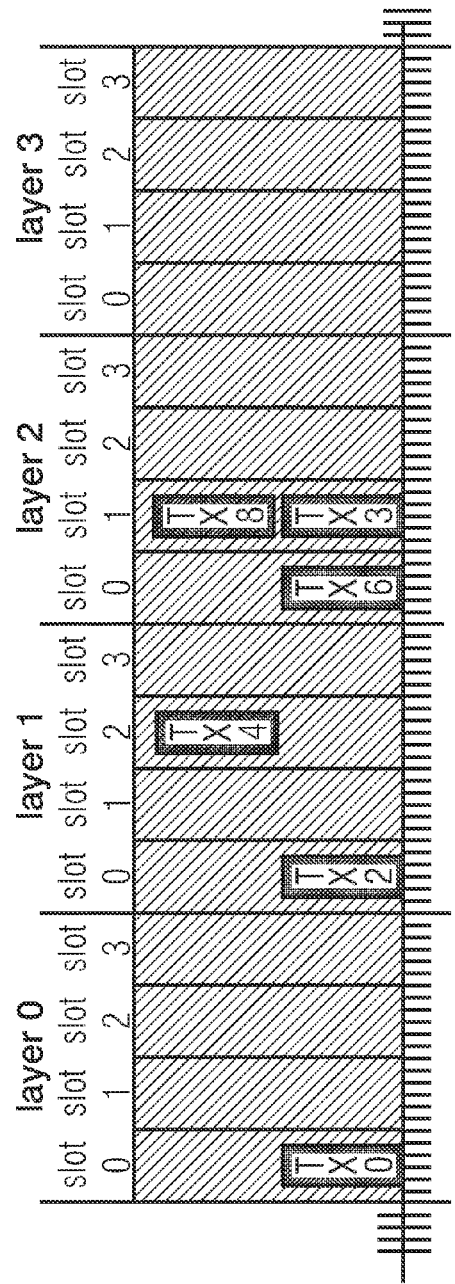
FIG. 6 shows a schematic time slot occupancy of the nodes of the sensor network for transmitting its synchronization signal and/or coordination signal.
Figure 7:
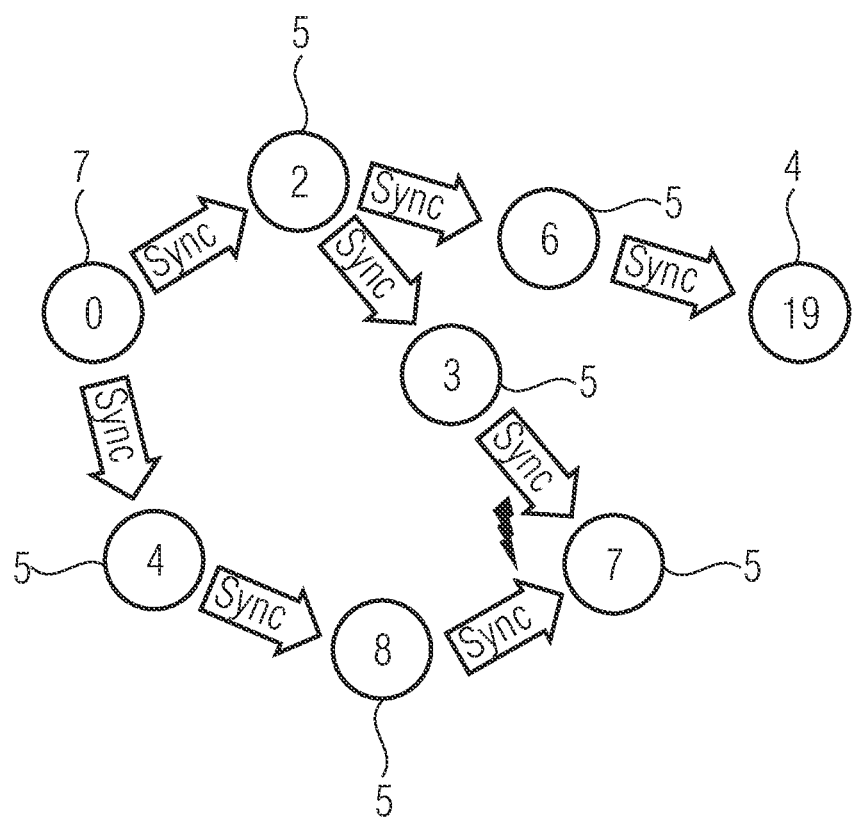
FIG. 7 shows a schematic detail of FIG. 2 to illustrate the embodiment tree type propagation of a synchronization signal and/or a coordination signal in the sensor network.

As indicated in conjunction with FIG. 4, a node automatically selects the time slot for its own transmission from the information (e.g., occupancy information), which it receives from the precursors and/or from its neighboring nodes in a decentralized organizational method (self-organization method). In practice it may happen that nodes on the same layer coincidentally seek the same time slot. FIG. 6 shows schematically the time slot occupancy of nodes for transmitting their synchronization signal, i.e., coordination signal. According to the situation depicted in FIG. 6, nodes no. 3 and no. 8 have both selected the "slot 1" time slot of layer 2. For example, if node no. 7 is in the transmission range of node no. 3 as well as in the transmission range of node no. 8, then collisions of data packets transmitted by nodes no. 3 and no. 8 may occur at the downstream node no. 7. Packet collisions at the receiver can lead to invalid packets, which are then discarded. These nodes are then no longer capable of receiving a predecessor node, which may result in them losing their synchronization with the rest of the network and no longer being able to store data. FIG. 7 again shows a collision of data packets at node no. 7 in a different schematic presentation. Starting from the master node 7 with node no. 0, a synchronization data packet is transmitted and is received by nodes no. 2 and no. 4 of the layer group 1, among others. A synchronization data packet then sent by node no. 2 is received by nodes no. 3 and no. 6 of the layer group 2, node no. 3 of which will be considered further here. Likewise a data packet sent by node no. 4 is received by node no. 8. Nodes no. 3 and no. 8 derive from the received synchronization data packets that they both belong to layer group 2, which is why they in turn send their synchronization packets within the time range 28 (FIG. 4), which is reserved for the layer group 2. With the present methods, the choice of the time slot within the time range 28 is made once randomly for each node. If nodes no. 3 and no. 8 seek the same time slot within the time range 28 for the time slot group 2, then there is a collision of data packets sent by each at node 7, as indicated in FIG. 7. Since node no. 7 is unable to incorporate itself into the network for lack of an opportunity to receive synchronization packets, node no. 7 also cannot deliver any acknowledgment to node no. 3 and/or node no. 8. The technical teaching disclosed herein also relates to the treatment of such situations, among other things.

Figure 8:
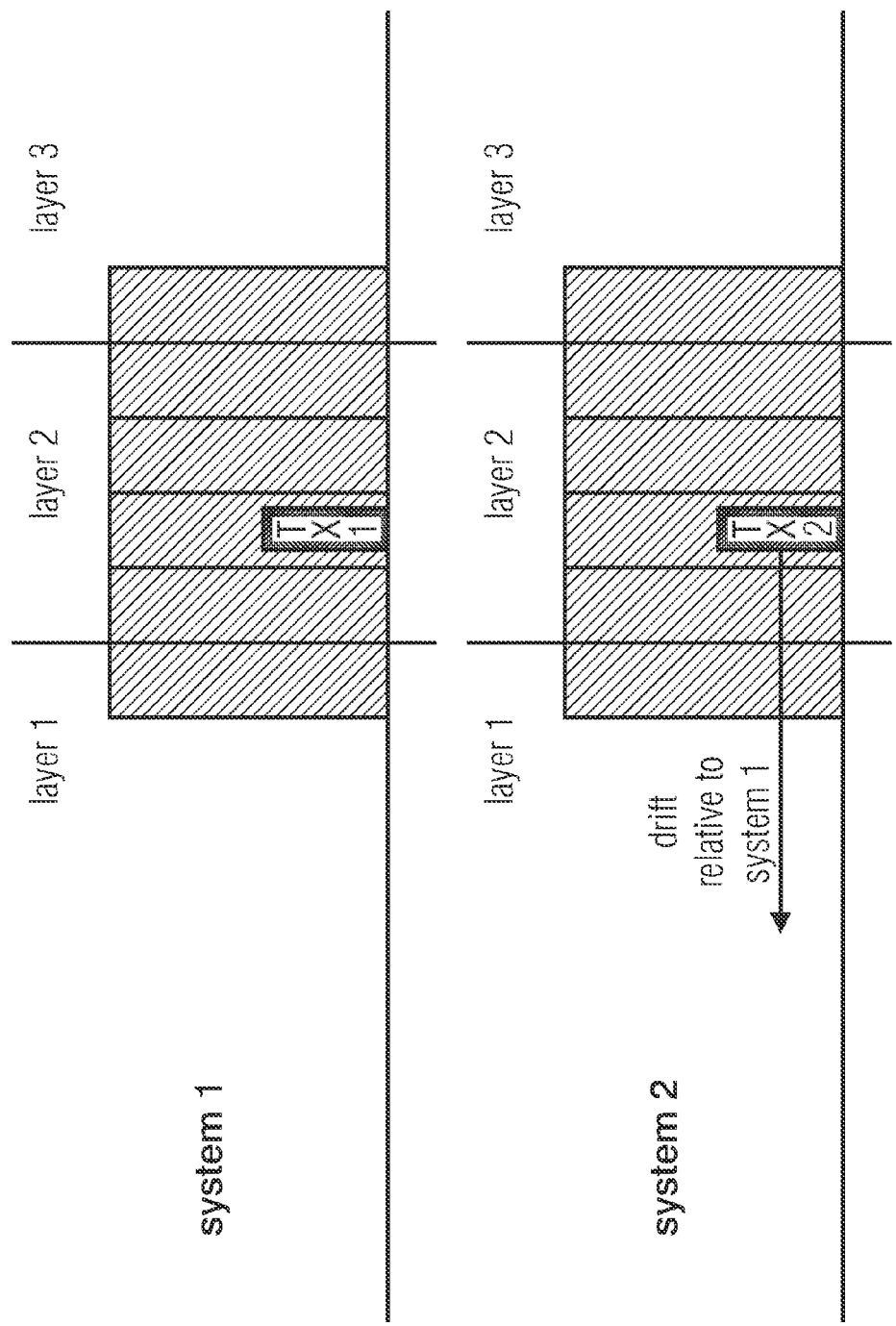
FIG. 8 shows an illustration of the drift of two independent sensor networks with sliding collisions.

In addition to such double occupancy within a network, so-called sliding collisions may also occur with independent networks. They are typically caused by independent time bases in systems with a minor small frequency difference. The time slots of independent systems therefore drift toward one another and at some points there is an overlap in time and thus interference occurs. FIG. 8 shows schematically such a drift of two systems with sliding collision. In system 1, a node sends a synchronization data packet during the time range for the layer group 2 within the second time slot, for example. In a second system and/or radio network, a node also sends a synchronization data packet during the second time slot of the layer group 2. Because of the different time bases of the two systems, reception of both data packets can still succeed initially, in particular when the second system, i.e., radio network is somewhat delayed in comparison with the first system, i.e., radio network, for example. However, because of differences in the clocks of the two systems, i.e., radio network, it may happen that system 2 catches up with system 1, so that the two data packets TX1 and TX2 then overlap. This situation of a sliding collision can also be taken into account by means of the technical teaching disclosed herein.

Figure 9:
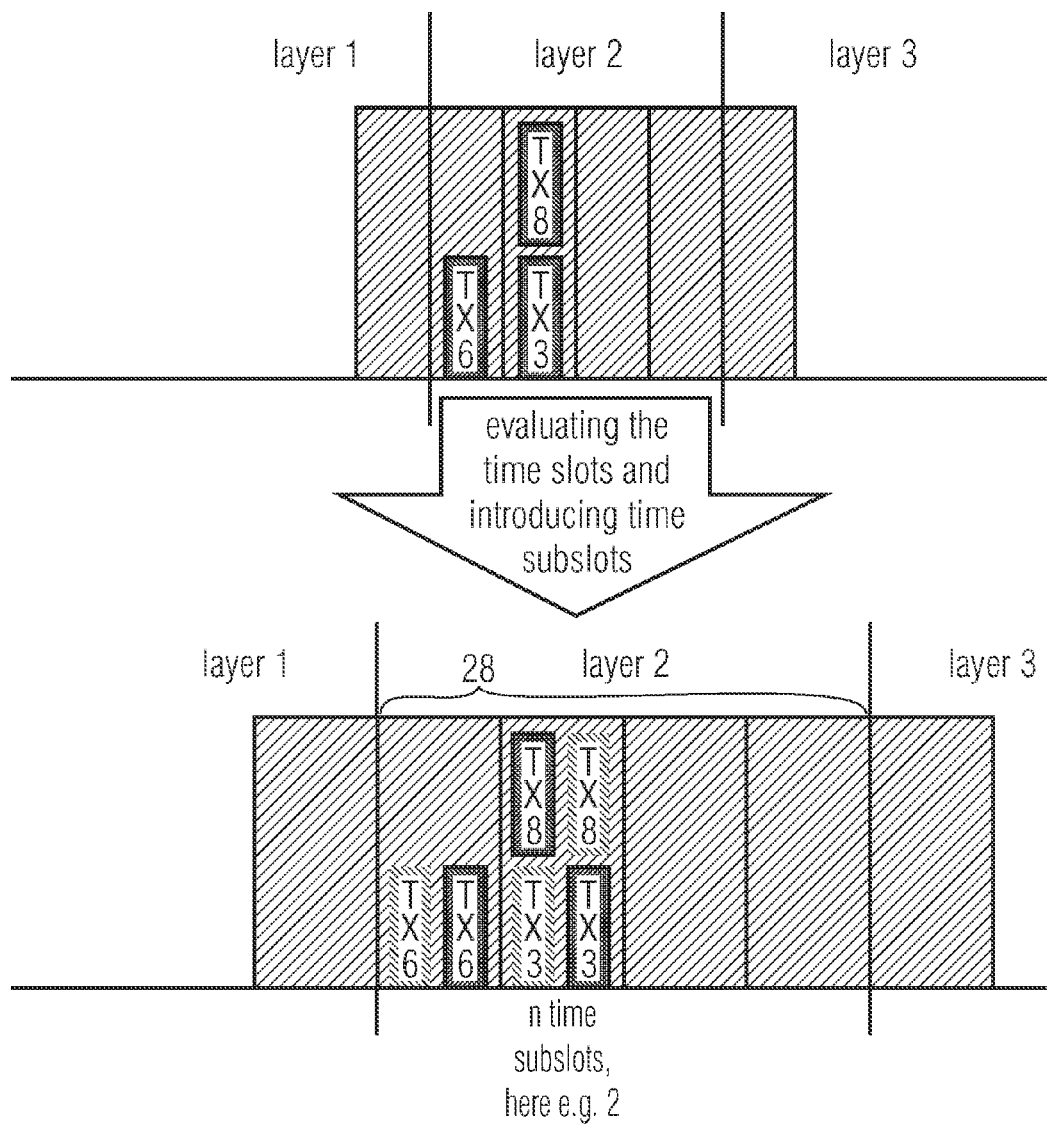
FIG. 9 shows a schematic diagram with respect to the introduction of subslots, one of which is selected for sending a data packet.

FIG. 9 illustrates schematically the proposed approach according to the technical teaching disclosed herein. In principle, the classification in time slots is retained but separate subslots at separate times, representing possible data packet time positions within the time slots, are defined for sending the information, i.e., the data packets, within the slots. FIG. 9 shows only the range for the layer group 2, i.e., the time range 28 from FIG. 4, as a detail for the purpose of illustration. The upper portion of FIG. 9 shows a time slot scheme, which is currently customary, and the lower part of FIG. 9 shows a time slot scheme using the technical teaching disclosed herein.

A node selects a subslot, i.e., a data packet time position for transmission of the information according to a random principle before every $i^{th}$ transmission of a data packet or at least one synchronization data packet. In the example depicted in FIG. 9, each time slot comprises two subslots, i.e., two possible data packet positions. In the first time slot, node no. 6 can send its packet in either a first subslot or a second subslot. A renewed random selection of the subslot occurs at least once every i transmission operations. A random selection of the subslot may occur again in particular with each transmission process (i=1). It should be noted that performing a renewed random selection of the subslot does not necessarily lead to a change in the subslot because of the fundamental randomness. In addition to a random selection of the subslot, it is also conceivable that each network node determines the respective subslot in which a data packet is to be sent according to a predetermined scheme, wherein this subslot determination is performed in different ways by the various network nodes. This makes it possible to largely prevent two nodes that could cause a collision of data packets at a third node because of their spatial positions, and this prevents them from repeatedly seeking the same subslot, so that the third node cannot receive any valid data packets for a lengthy period of time.

In the example illustrated in FIG. 9, node no. 8 transmits in the first subslot of the second time slot of the time range 28, and node no. 3 is transmitting during the second subslot. In this way, at least the data packet sent by node no. 8 can be received at node no. 7, if node no. 7 is within the transmission range of node no. 8. Under some circumstances, the data packet of node no. 3 sent during the second subslot can also be received at node 7.

Because of the relatively frequent reselection of the respective subslot, there are certain probabilities of a collision within the corresponding time slot. Assuming that two subslots are provided per time slot and that two nodes which together transmit data packets that might possibly collide with one another have both selected the same time slot, then these probabilities of collision are as follows: collisions occur when both nodes are transmitting in the early subslot or when both nodes are transmitting in the late subslot. If one node transmits in the early subslot and the other node transmits in the late subslot, then the first data packet (at least) can be received correctly. The following table summarizes the reception probabilities for the case when each node transmits its information, i.e., its data packet, in the early position with a 50% probability. The successor nodes, i.e., node no. 7 in FIG. 2 or FIG. 7, has selected node no. 3 as the precursor node. In the example considered here, node no. 7 is capable of receiving only one single packet during one time slot.

| Node no. 3 | early (p = 50%) | late (1 − p = 50%) | early (p = 50%) | late (1 − p = 50%) |
|---|---|---|---|---|
| Node no. 8 | early (p = 50%) | early (p = 50%) | late (1 − p = 50%) | late (1 − p = 50%) |
| Reception at node no. 7 | Probability that both nodes transmit in the early time slot is 0.5 × 0.5 = 0.25 Collision (p = 25%) | Node no. 8 is received (p = 25%) Wrong predecessor but node no. 7 can utilize information to retain synchronization | Node no. 3 is received (p = 25%) Correct predecessor | Collision (p = 25%) |

Node no. 7 thus receives a node of the network with a probability of p = 50% and can therefore maintain the synchronization with the network. Node no. 7 receives its correct predecessor node no. 3 with p = 25% and can conduct data communication.

Figure 10:
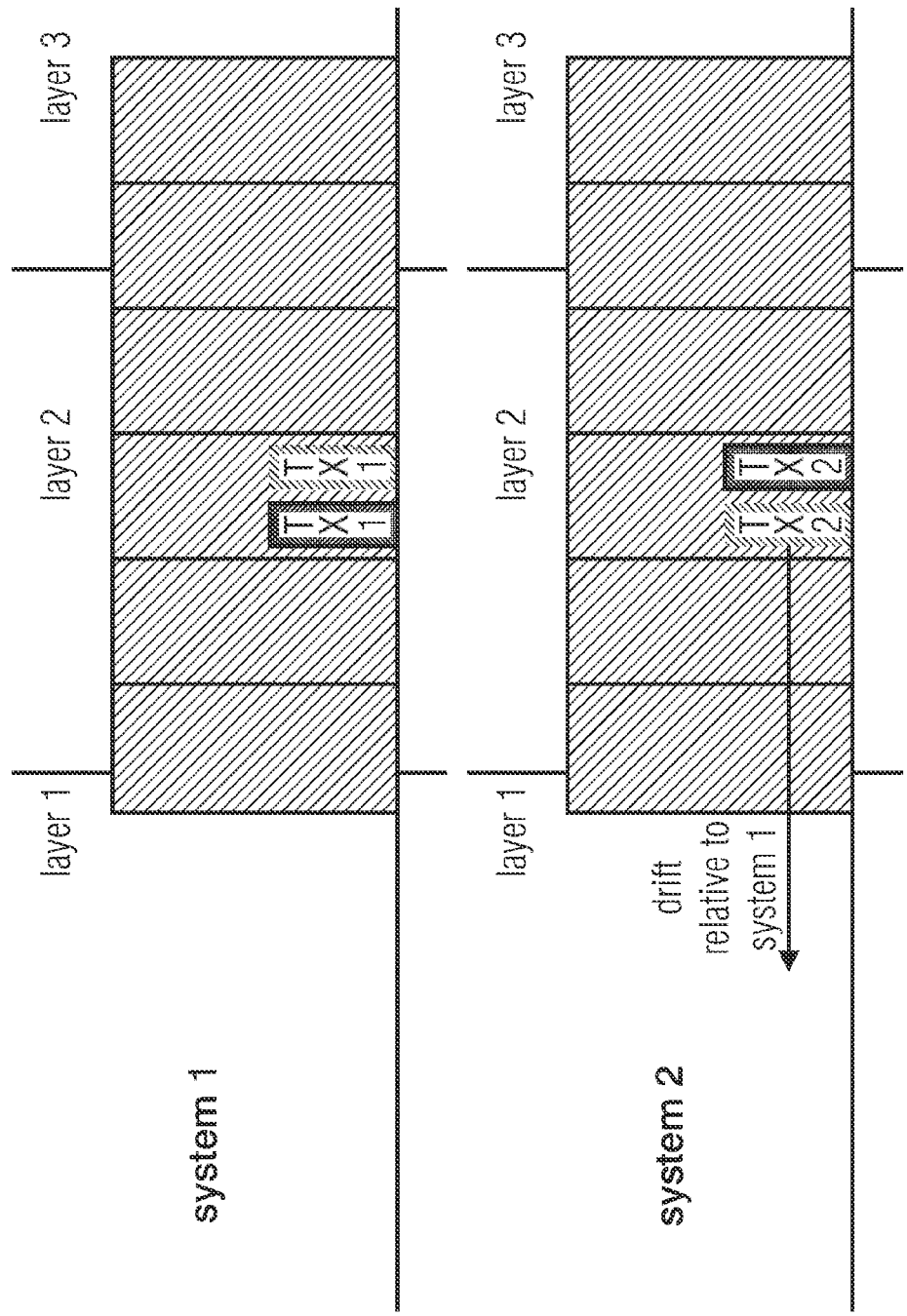
FIG. 10 shows a schematic diagram of the drift of two independent sensor networks having sliding collisions when using the technical teaching disclosed herein.

It is also possible to detect sliding collisions, as shown in FIG. 10. As in FIG. 8, a system 2 drifts into a system 1. A node of system 1, which is synchronized to the signal TX1, can receive all TX1 packets in the early time slot position, whereas a certain percentage (e.g., 50%) of the packets in the late time slot position have interference due to system 2 because the signal TX2 of a node of system 2 is sent with this probability in its earlier time slot position. A receiver belonging to system 1 can ascertain that packets are received more often in the early time slot position than those in the late time slot position. It can be concluded from this finding that the late time slot position, i.e., the late subslot, has interference, which may be caused by the second system and/or the sensor network, for example. The node belonging to system 1 can detect a sliding collision in this way.

Within the context of the technical teaching disclosed herein, the signaling of the subslot currently being used may be provided in the corresponding data packet, so that the receiver can determine the correct time base for the frame structure.

For compatibility with old systems, it is also advisable to signal whether subslots are used at all. Two bits are sufficient for the above example: a first bit of these two bits may indicate, for example, whether or not subslots are used:

| Value of $bit_0$ | Meaning |
|---|---|
| 0 | No subslots, synchronization signal is sent at the expected time of the old system |
| 1 | Two subslots are used |

The second bit (bit 1) may mean, for example:

| Value of $bit_1$ | Meaning |
|---|---|
| 0 | The early time slot position, i.e., the early subslot, is used for the current packet |
| 1 | The late time slot position, i.e., the late subslot, is used for the current packet |

Figure 11:
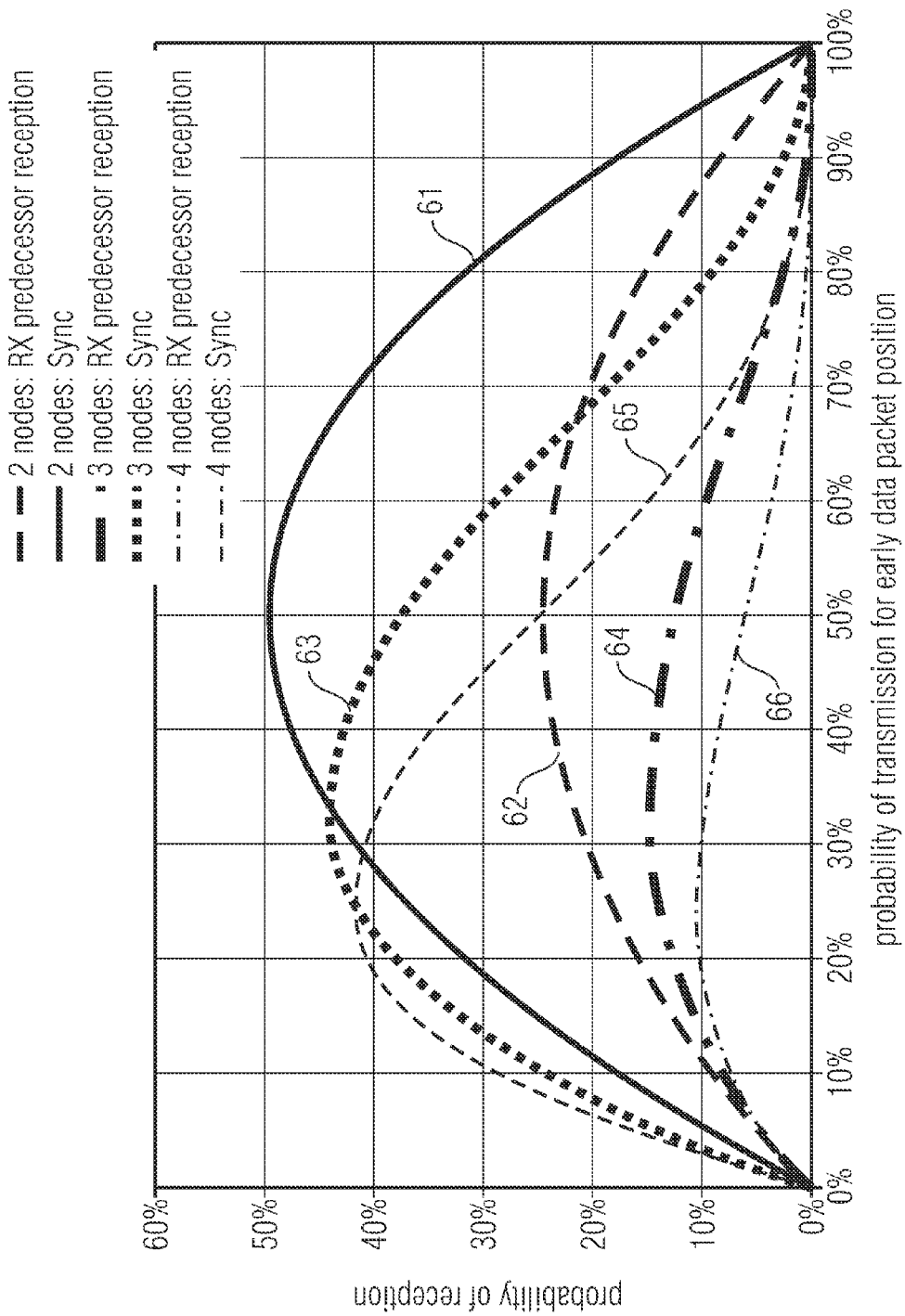
FIG. 11 shows a graphic plot of the reception probability as a function of the probability of transmission for a certain data packet time position within a time slot for different conditions.

FIG. 11 shows various probability densities, which are represented schematically for correctly receivable packets of the correct predecessor or at least one predecessor as a function of the number of nodes and the probability of occupancy of the early time slot position, i.e., the early subslot. The curve 61 shows the probability density for reception of a data packet that can be used at least for retaining the synchronization with the remaining network for the case when two predecessor nodes are using the same time slot. A curve 62 indicates the probability that a data packet is received by the correct predecessor node in this situation. It can be seen here that both curves have their maximum at a transmission probability of 50% for the early data packet position.

A curve 63 represents the probability density that a data packet, which is used for synchronization, can be received when three nodes share the same time slot. A curve 64 indicates the corresponding case for reception of a data packet from the correct predecessor node. The two curves 63 and 64 have a maximum at approx. 33% transmission probability for the early data packet position. Two curves 65 and 66 show the reception probability densities for the case when four nodes share one time slot, namely the probability of receiving a synchronization data packet (curve 65), i.e., a data packet from the correct predecessor (curve 66). The two curves have their peaks at approx. 25% for the transmission probability for the early data packet position.

FIG. 11 thus shows that at a time slot occupancy by three nodes, use of the early data packet position, i.e., the early subslot still allows 44% packet reception with a probability of p=1/3 to maintain synchronization and allows 14.8% packet reception from the correct predecessor. At a time slot occupancy by four nodes, use of the early data packet position, i.e., the early subslot, still allows approx. 42% packet reception with a probability of p=1/4 to maintain synchronization and allows approx. 10.5% packet reception from the correct predecessor.

Higher node densities may make it useful for more than two subslots per time slot to be introduced.

Figure 12:
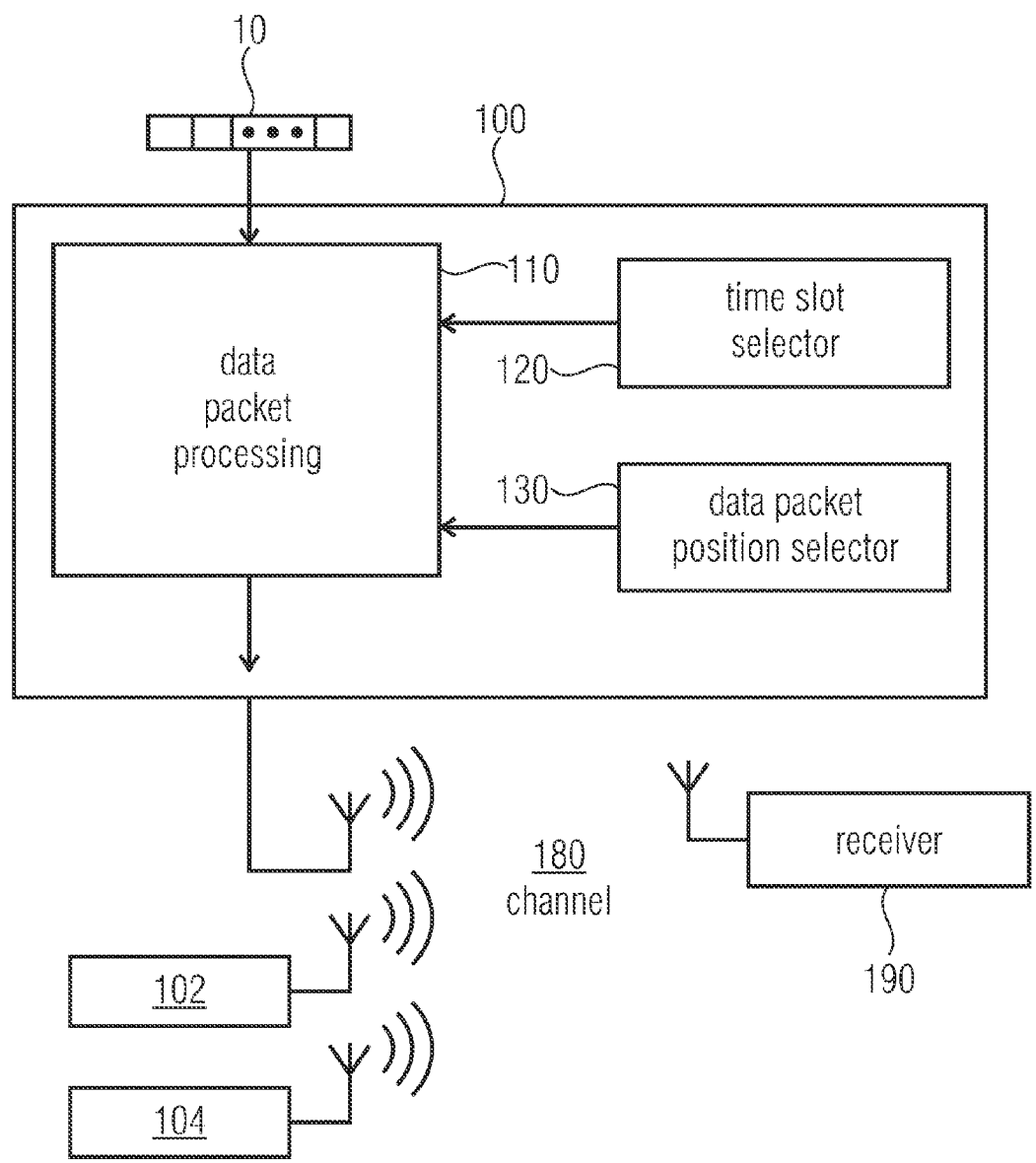
FIG. 12 shows a schematic diagram of a transmitter according to an embodiment of the technical teaching disclosed herein.

FIG. 12 shows a schematic block diagram of a transmitter 100 according to one embodiment of the technical teaching disclosed herein. The transmitter 100 is part of a radio network to which one receiver 190 and two other transmitters 102, 104 also belong according to the diagram in FIG. 12, which is also to be understood as an example. Instead of a radio network, a network based on a different technology, for example, a hard-wired technology, (fiber) optic network or ultrasonic transmission network could also be provided.

The transmitter 100 receives at an input a data packet 10, which is to be transmitted and is sent internally to a data packet processing 110 of the transmitter 100. Data packet processing 110 may be configured to analyze some parts of the data packet 10 to ascertain how the data packet 10 should be sent over a channel 180 to the receiver 190. Data packet processing may also be configured to process data packets 10 or parts thereof for the radio transmission, in particular, for example, to perform an encoding and a digital-analog conversion of the digital data contained in the data packet 10. The transmitter 100 additionally comprises a time slot selector 120, which is configured to transfer information about a time slot to which the data packet 10 is to be sent over the channel 180 to the data packet processing 110. The choice of time slot to be used may be made on the basis of an analysis of synchronization data packets received, which have been sent by other nodes, in particular a predecessor node according to the network hierarchy. Inasmuch as possible, a receiver of the node to which the transmitter 100 also belongs may attempt to receive radio signals from neighboring nodes, which belong to the same layer group as the network nodes in question here. In this way, it is possible under some circumstances to ascertain which time slots are already occupied by other neighboring nodes. In this way, the network node in question can yield to time slots which are not yet occupied or are occupied only by a relatively few other neighboring nodes. However, it is not always possible to receive signals from the neighboring nodes, in particular when the network node in question is outside of the transmission range of the neighboring node to which the transmitter 102 or the transmitter 104 may belong, for example.

The transmitter 100 additionally comprises a data packet position selector 130 for selecting a data packet time position within the selected time slot. Typically the data packet time position is selected anew at least for every $i^{th}$ data packet. Under some circumstances, it holds that i=1, so the data packet time position is newly selected for each data packet. For example, if the transmitter 100 and the transmitter 102 have both selected the same time slot on the basis of corresponding specifications of their respective time slot selectors 120, then renewed selection of the data packet time position, which is performed for at least every $i^{th}$ data packet, prevents data packet collisions from occurring repeatedly within the time slot. It may happen that collisions continue to occur sporadically, but as a rule no collision will occur with any of the following frames, so that reception of at least one data packet from one of the transmitters 100 or 102 by the receiver 190 is made possible.

Figure 13:
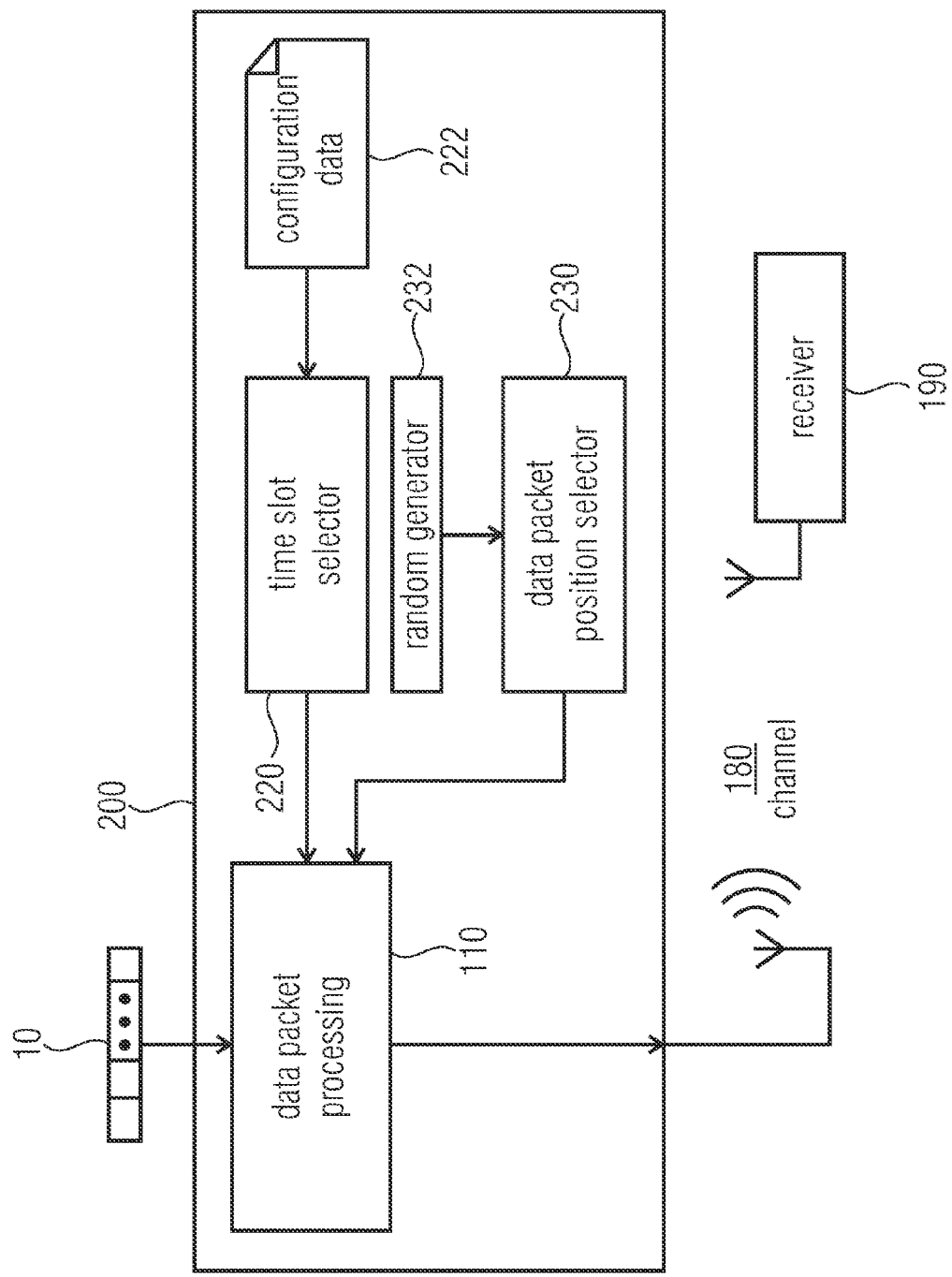
FIG. 13 shows a schematic block diagram of a transmitter according to another embodiment of the technical teaching disclosed herein.

FIG. 13 shows a schematic block diagram of a transmitter 200 according to another embodiment of the technical teaching disclosed here. The transmitter 200 comprises a time slot selector 220, which in turn comprises an input for configuration data 222. The configuration data 222 may be permanently programmed into the transmitter 200, for example, or may be obtained as the result of an analysis of received radio signals. The configuration data 222 in FIG. 13 is depicted as part of the transmitter 200, wherein it may be provided as an alternative that the configuration data 222 is stored outside of the transmitter 200. On the basis of the configuration data 222, the time slot selector 220 again selects a time slot for transmission of data packet 10 in a manner similar to that shown in FIG. 12 and described in conjunction therewith.

Furthermore, the transmitter 200 comprises a random generator 232, which is connected to an input of the data packet position selector 230. In this way, the data packet time position can be selected on the basis of a random process. The randomly selected data packet time position is then in turn transferred to the data packet processing 110, which takes this information into account in sending a radio signal based on data packet 10 to the receiver 190 over channel 180.

Figure 14:
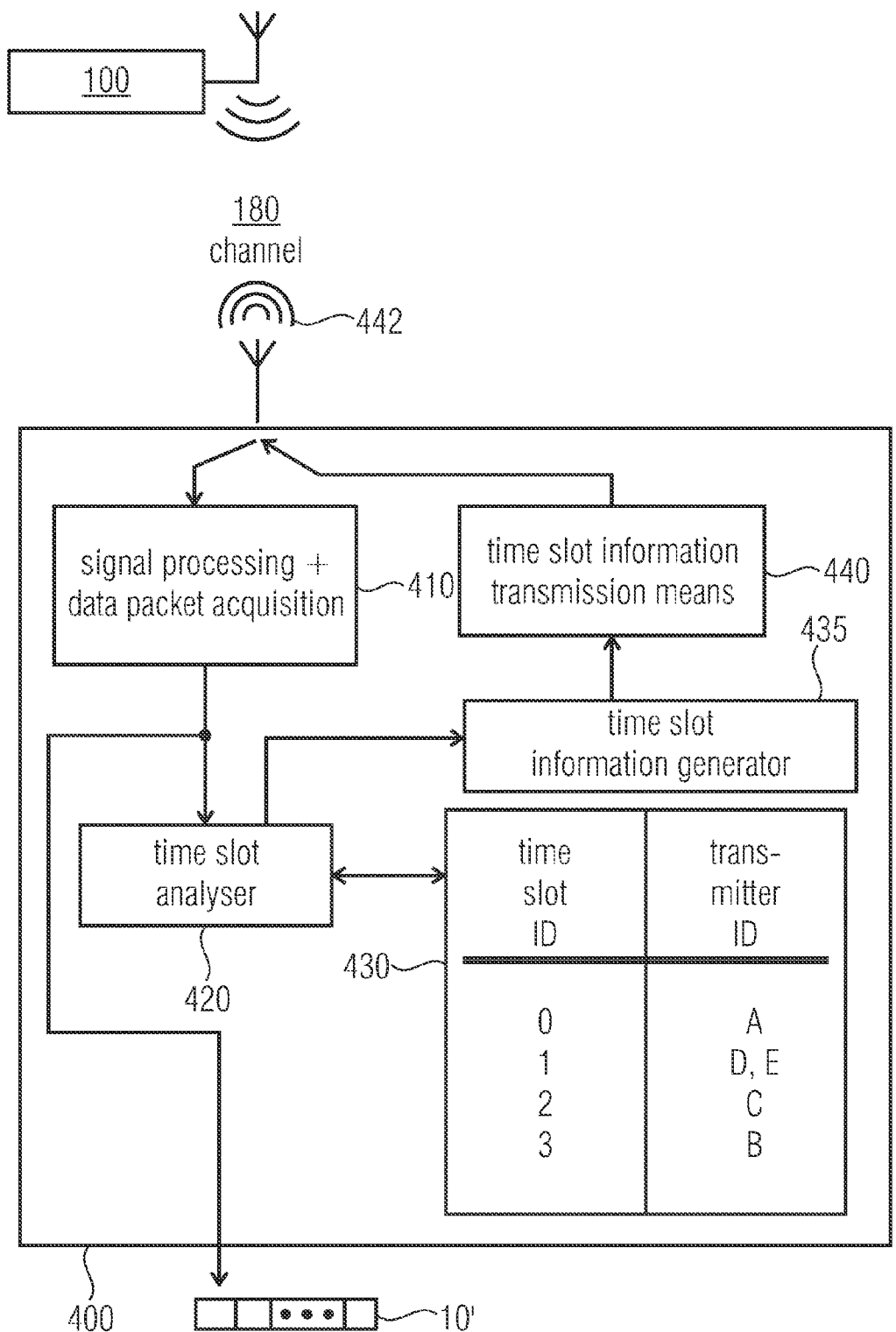
FIG. 14 shows a schematic block diagram of a receiver according to an embodiment of the technical teaching disclosed herein.

FIG. 14 shows a schematic block diagram of a receiver 400 according to one embodiment of the technical teaching disclosed herein. The receiver 400 is configured to receive a radio signal sent by the transmitter 100 over channel 180. The transmitter 100 comprises a signal processing and data packet extraction unit 410, a time slot analyzer 420, a memory 430 for storing current time slot occupancies by various transmitters, a time slot information generator 435 and a time slot information transmission unit 440. The signal processing and data packet extraction 410 are configured as a unit to process the signal arriving over the channel 180, so that a data packet 10' can be extracted, corresponding essentially to a data packet sent by the transmitter 100. The data packet is transmitted from the signal processing and data packet extraction unit 410 to the time slot analyzer 420, which extracts information from the data packet 10' about the time slot to which the data packet was sent and from which transmitter it was sent. In this way, the memory 430 can fill a table with data indicating, for example, which transmitter (e.g., transmitters A through E) is currently occupying which time slot 0 to 3. In the current position shown in FIG. 14, for example, the time slot 1 is occupied by transmitters D and E. By means of the information contained in the memory 430, the time slot analyzer can now check on whether data packets have been received by more than one transmitter during a time slot of a current frame or during at least a corresponding time slot of a preceding frame. The time slot analyzer can thus ascertain whether a certain time slot (e.g., time slot 1) has been used by only one transmitter in the past or whether within a time horizon extending into the past (e.g., the last 10 frame structures) data packets have been received from different transmitters, which would indicate that these transmitters share the corresponding time slot and thus there is an increased probability of a collision of data packets sent by the transmitters competing for the time slot. If the receiver 400 is capable of receiving and processing two data packets sent during one and the same time slot but at different time slot positions, it may be sufficient to analyze only the time slot of the current frame because collision-free data packet transmissions occur occasionally with at least a certain probability and it is possible to ascertain on their basis which transmitters are using the corresponding time slot.

The receiver 400 additionally comprises the time slot information generator 435 for generating time slot information indicating whether the time slot or the corresponding time slot of at least one of the preceding frames contains data packets of more than one transmitter. An input of the time slot information generator 435 may thus be connected to an output of the time slot analyzer 420. The time slot information generator 435 can relay the time slot information generated on the basis of this information to the time slot information transmission unit 440, which processes this information for sending. The time slot information may be sent as a signal 442 over the channel 180, for example, sending it either in a targeted manner to the nodes whose transmitters are using the corresponding time slot that is the subject matter of the time slot information or as a radio signal to all the neighboring nodes within the transmission range of the node to which the receiver 400 belongs. The time slot information transmission unit 440 can transmit the signal 442 during the meshed data domains 18, for example (FIG. 3). In the schematic block diagram of FIG. 14, the time slot information transmission unit 440 is shown as part of the receiver 400. Alternatively, the time slot information can also be transmitted via a transmitter, which belongs to the same node as the receiver 400. The time slot information transmission unit 440 would thus be outside of the receiver 400 and would not be a component thereof.

To be able to receive an analyze the time slot information generated by the receiver 400, the transmitters 100, 200 of FIGS. 12 and 13 still comprise a reception unit for receiving at least one item of time slot information (or they interact with such a unit), which is sent by the receiver 400 in response to a data packet sent by the transmitter. The time slot selector of the transmitter 100, 200 may be configured to check on the basis of the time slot information to ascertain whether a different time slot may be selected for transmitting future data packets and then to optionally perform this choice. In this way, the transmitter 100, 200 can react to situations in which it is competing with other transmitters (e.g., 102, 104 in FIG. 12) for a time slot. It may happen that the transmitter 100, 200 receives time slot information from several receivers 400, which may be coordinated, so that the resolution of a conflict does not result in another conflict at another receiver. If it can be recognized on the basis of the at least one item of time slot information that at least one time slot is not currently being used by any transmitter, then the transmitter 100, 200 can yield to this currently unused time slot in the event of a conflict at another time slot. Otherwise the transmitter 100, 200 still has the option of selecting the time slot, which is using the fewest transmitters.

As an additional option, the transmitter 100, 200 may be configured to insert data packet time position information into the data packet sent by the transmitter 100, 200, indicating the data packet time position in which the packet is being sent.

To return to the schematic block diagram of the receiver 400 shown in FIG. 14, the time slot analyzer 420 may still be configured to check on whether an expected data packet was received within the anticipated time slot and, if the expected data packet fails to arrive, to generate information about a possible collision. The time slot information generator 435 may still be configured to insert information about a possible collision of two or more data packets within the expected time slot into the time slot information. The failure of an expected data packet to arrive may be detected, for example, by the fact that the data packet could have been received with at least a certain probability during a preceding frame. If a measured average reception value is lower than a certain threshold value, then it is possible to speak of a failure of an expected data packet to arrive. One possible hypothesis for the failure of a data packet to arrive may be that there has been a collision of two or more data packets of different transmitters at the receiver, so that the expected data packet could not be received by the receiver 400. Other possible hypotheses include that the transmitter 100, 200 stopped sending the data packet, e.g., because of a deactivation of the corresponding network node or because of depletion of the energy supply, e.g., in the case of a battery-powered network node, or that the receiver 400 is located outside of the transmission range of the transmitter 100, 200. If there has in fact been a collision, the corresponding transmitter from which the expected data packet was sent may react to the time slot information and try an alternative time slot.

The time slot information transmitter 440 of the receiver 400 may also be configured, so that the time slot information is to be sent to at least one first transmitter that has sent a current data packet and at least one second transmitter to which the same time slot as the first transmitter was allocated on the basis of a time slot schedule. In the case of time-multiplexed networks in particular, the time slot information transmitter 440 thus need only send time slot information during the time slot or slots during which the first transmitter and/or the second transmitter is/are ready to receive such time slot information. The time slot information transmitter 440 may also be configured to send time slot information to a transmitter in question on the basis of the time slot schedule, which comes before, according to a classification criterion, at least one other transmitter to which the same time slot is allocated on the basis of the time slot schedule. As such a classification criterion for coordination, it would be conceivable for the receiver to inform the predecessor node having the lowest node no. of the nodes involved in the collision. The predecessor node informed in this way will then attempt to resolve the conflict by choosing an alternative time slot having less occupancy or none at all. This step of informing the predecessor node(s) about the double occupancy or a sliding collision is one possible measure for reacting to the detection of a double or multiple occupancy and/or a sliding collision. If multiple successors detect these collisions, a strategy is needed for which predecessor is to be informed and/or which predecessor node should respond. This strategy can be implemented by means of the aforementioned classification criterion or another classification criterion, so that the following nodes inform, for example, the predecessor node having the lower node no.

At higher node densities, it is conceivable for more than two nodes to attempt to occupy one time slot. Then it is better to use the early time slot position of the subslots with a lower probability than 50%.

The receiver 400 may also comprise a reception statistics calculator for successfully received data packets at a minimum of two different data packet time positions of a time slot. The reception statistics calculator or time slot information generator 435 may also be configured to compare a difference in reception statistics for the at least two different data packet time positions with a threshold value, and if the threshold value is exceeded, to insert information about a possible sliding collision into the time slot information. Assuming that all possible time slot positions and/or subslots within one time slot are equally probable, the receiver 400 should receive on the average an equal number of data packets in the different time slot positions and/or during the different subslots. As can be seen on the basis of FIG. 10, the system 2 first influences the late subslot of system 1 when system 2 has drifted from the right to the left in comparison with system 1, as shown here (i.e., the time base of system 2 is faster than the time base of system 1). However, the early time slot position and/or the early subslot in the second time slot of the time range for the layer group 2 is not initially affected by the sliding collision between systems 1 and 2, which has the effect that the reception statistics for the early subslot are lower than those for the late subslot.

The receiver 400 may also comprise a synchronization unit for synchronizing a time slot control of the receiver 400 by means of the received data packet. As already explained above, the receiver can analyze information in this data packet provided for this purpose, in particular analyzing which time slot position was used to send the corresponding data packet. With the help of this information, the receiver 400 can then determine the time base for the frame structure.

Figure 15:
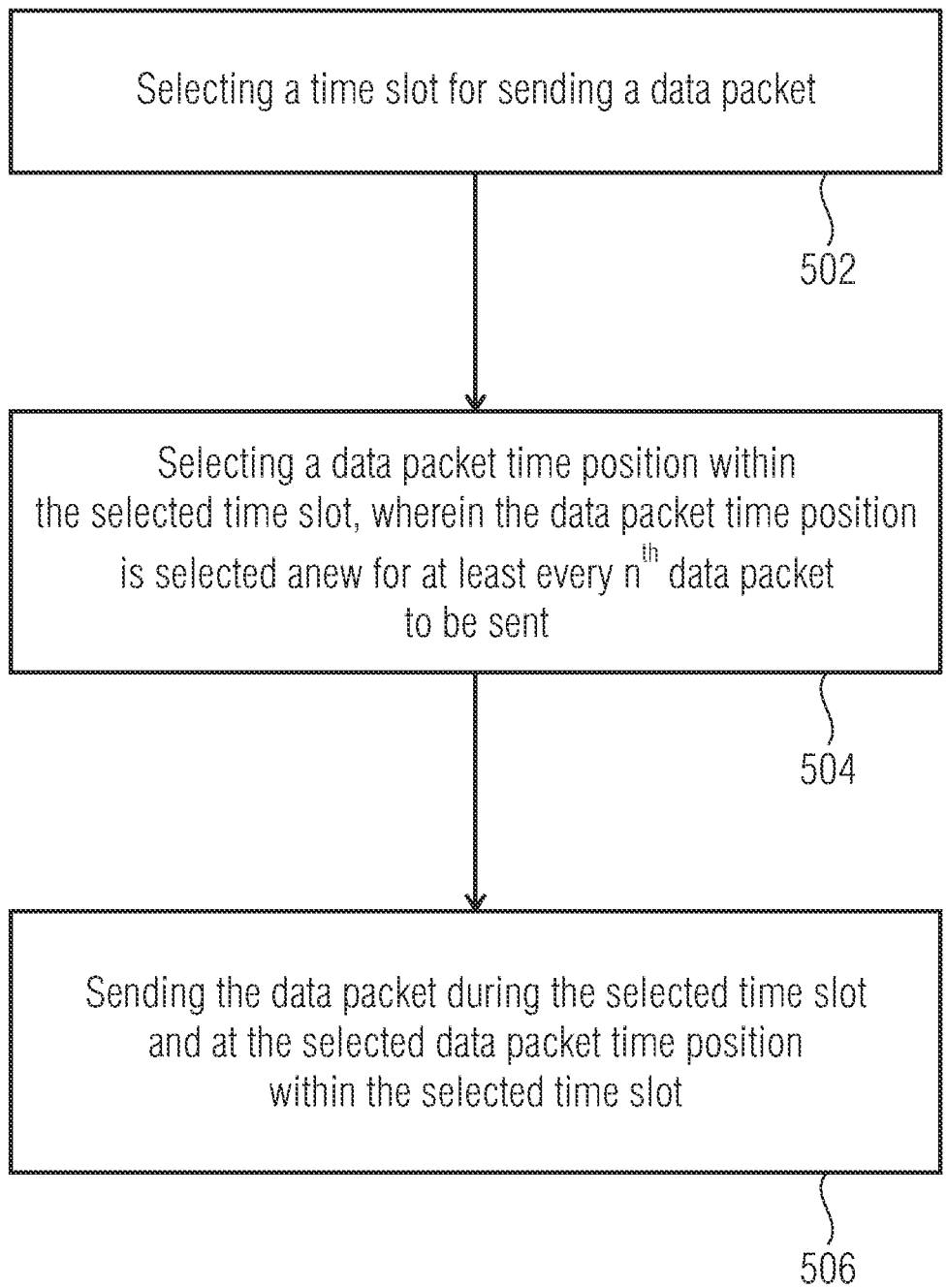
FIG. 15 shows a schematic flow chart of a method for transmitting according to an embodiment of the technical teaching disclosed herein.

FIG. 15 shows a schematic flow chart of a method for sending data packets according to one embodiment of the technical teaching disclosed herein. First, in the frame of an action 502, a time slot is selected for sending a data packet. This may be done on the basis of a time slot schedule, which allocates certain time ranges for sending data packets within a frame structure to certain hierarchy levels, for example.

A data packet time position, i.e., a subslot, is then selected within the selected time slot, as shown in FIG. 15 in conjunction with the process action 504. The data packet time position is selected anew here at least for every $i^{th}$ data packet to be sent. This ensures that the data packet time position will be varied at least occasionally within the selected time slot, so that a data packet will be sent at least occasionally without collision with one or more other data packets at a certain data packet time position. This data packet, which is not involved in a collision with other data packets, makes it possible for the receiver to ascertain that a certain transmitter is using the selected time slot for sending data packets. Information about which transmitters are currently occupying which time slots can typically be collected over several frame structures in this way.

In an action 506 of the method for sending data packets, the data packet is then sent during the selected time slot and at the selected data packet time position which is within the selected time slot.

Selection of the data packet time position may also be performed in a random manner. Furthermore, i=1 may hold in particular, so that the data packet time position and/or the subslot is newly selected for each data packet.

This method may additionally comprise: receiving time slot information from at least one receiver which has received the data packet sent; checking on whether it is useful to select another time slot for sending future data packets; and selecting the other time slot, if need be, wherein the transmitter is allocated to the channel during the other time slot according to a time slot schedule. By analyzing the time slot information sent by a receiver, the transmitter has the possibility of taking measures which will make future collisions of data packets less probable or under some circumstances prevent them entirely for a certain period of time. To this end, the method for transmitting may rely on the other time slot, which is also allocated to the transmitter according to the time slot schedule, if such a time slot exists and is not yet occupied at all or at least is not occupied as heavily by other transmitters belonging to the same layer group as the transmitter in question here, which is implementing the method for sending, for example.

According to one embodiment of the technical teaching disclosed herein, the method for sending data packets may also comprise insertion of data packet time position information into the data packet, indicating at which data packet time position the packet is being or has been sent. A receiver which is receiving the data packet can synchronize itself more precisely with the remainder of the network, namely essentially with the precision of a subslot, based on this data packet time position information. In addition, this data packet time position information may also be used for other purposes.

Figure 16:
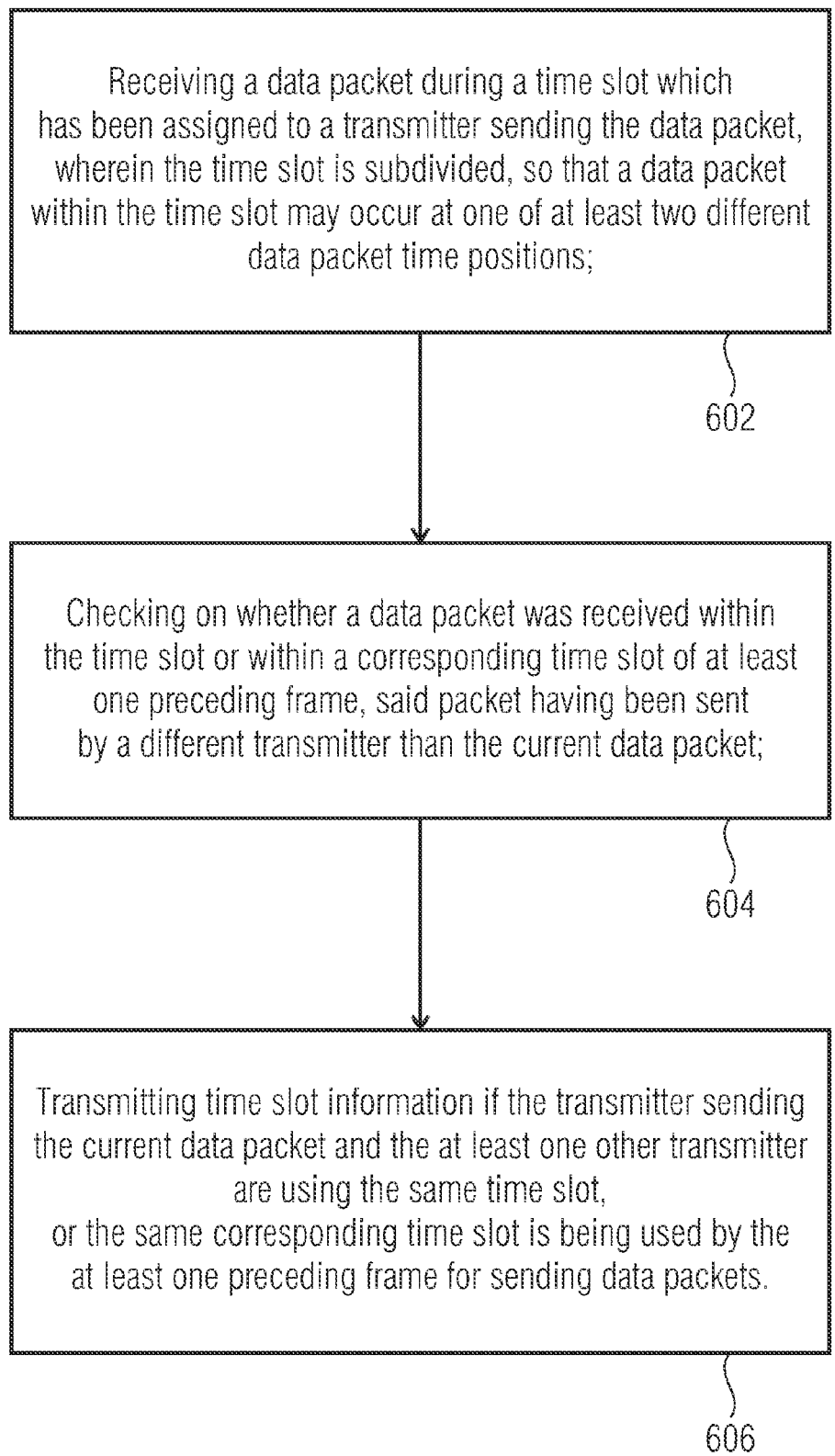
FIG. 16 shows a schematic flow chart of a method for receiving according to an embodiment of the technical teaching disclosed herein.

FIG. 16 shows a schematic flow chart of a method for receiving data packets according to one embodiment of the technical teaching disclosed herein. This method comprises actions for receiving 602 a data packet, for checking 604 and for transmitting 606 time slot information. As part of the action 602, the data packet is received during a time slot, which is assigned to a transmitter sending the data packet. This time slot is subdivided, so that a data packet within the time slot may occur at one of at least two different data packet time positions. As part of the action 604, a check is performed on whether a data packet sent by a different transmitter than the current data packet was received within the time slot or within a corresponding time slot of at least one preceding frame. If it can be ascertained that during the current time slot or during corresponding preceding time slots, different transmitters have sent data packets using the same time slot, then there is in principle a risk of collision of data packets from two different transmitters. Based on the teaching disclosed herein, it is provided that a data packet is not fixed in a certain data packet time position within a time slot, so it is possible to prevent the data packets transmitted by two or more different transmitters from colliding with one another over a longer period of time, i.e., multiple frame structures.

In the action 606, the time slot information is transmitted if the transmitter sending the current data packet and the at least one transmitter are using the same time slot or the same corresponding time slot of the at least one preceding frame for sending data packets. The method for receiving data packets thus generates an acknowledgment to the method for sending the data packets, which under some circumstances can prompt the method for sending data packets to change the selected time slot.

Although the method illustrated in FIG. 15 for sending data packets is implemented in conjunction with a traditional method for receiving data packets, one can typically observe that data packet collisions in this case cannot be prevented, but there cannot be any permanent collision situation because at least with every $i^{th}$ data packet, the data packet time position for the successive data packet(s) is selected anew.

Within the framework of this method for receiving data packets, it is also possible to check on whether an expected data packet was received within an expected time slot. If the expected data packet has failed to arrive, then information about a possible collision can be generated. This information about the possible collision can then be transmitted and made available in this way to the transmitters causing this collision, for example.

The method may additionally include transmitting time slot information to at least one of the transmitters sending the current data packet and the at least one other transmitter. If one of the two transmitters is to be addressed in a targeted manner, the transmission of time slot information may be directed to the transmitter arriving before other transmitters in accordance with a classification criterion. Such a classification criterion may comprise, for example, the node no. of the network node to which the transmitters are assigned.

Within the context of the method for receiving data packets, it is also possible to ascertain whether the reception statistics for at least two different data packet time positions of a time slot differ significantly from one another on the average. If a significant difference between the reception statistics for at least two different data packet time positions can be ascertained, then information about a possible sliding collision can be sent.

This method may also comprise synchronizing a time slot control, e.g., for a receiver, by means of the received data packet.

The technical teaching disclosed herein may indeed lead to a reduction in performance but will not result in a total failure of communication of the node (and/or the subtree) ("progressive exacerbation"; English: "graceful degradation"). Double occupancy of time slots or sliding collisions can be detected at locations where they cause errors (at the receiver) and countermeasures can be initiated. Double occupancy or sliding collisions can be differentiated on the basis of the different error pattern (probability of correctly received packets in the early and late data packet positions, respectively) and different countermeasures can be taken.

The introduction of subslots, i.e., data packet positions can be implemented in a very compact manner over time. Typically a reception time window in a synchronous receiver may be longer in time than the transmission packet in order to compensate for jitter and drift processes in the time base. However, drift processes need not be [compensated] only for each subslot but instead for the entire time slot. Therefore, a time slot is lengthened only by the duration of one subslot (plus short jitter compensation times).

As an alternative to the technical teaching disclosed herein, instead of lengthening a time slot with subslots, the time taken to do this within the frame structure may be utilized to introduce more time slots. Although this results in a lower probability of double occupancy, the problem still persists in principle. Furthermore, time slots are able to compensate in principle for jitter or drift processes in the time base, i.e., the overhead for new time slots is greater than the overhead caused by new subslots. Another alternative to the technical teaching disclosed herein would be a random selection of a time slot from a time slot available for this transmitter. However, this would result in the receivers having to be ready to receive during all time slots in which a data packet intended for them might be sent, which would in turn lead to increased energy consumption by the receivers.

As yet another alternative to the technical teaching disclosed herein, a listen-before-talk method or CSMA (carrier sense multiple axis) could be introduced on the transmitter end. However, this would lead to a higher current consumption at the transmitter because the channel may first be monitored. Furthermore, the period of time for a reasonable CSMA is often too short, i.e., sense times and back-off times cannot be accommodated reasonably in a short transmission time slot.

Although many aspects have been described in conjunction with a device, it is self-evident that these aspects also constitute a description of the corresponding method, so that a block or a module of a device could also be understood as a corresponding method step or as a feature of a method step. Similarly, aspects that have been described in conjunction with a method or as a method step also constitute a description of a corresponding block or detail or feature of a corresponding device. Some or all of the method steps may be performed by a hardware apparatus (or by using a hardware apparatus) such as a microprocessor, a programmable computer or an electronic circuit. In some embodiments, some or more of the most important method steps may be executed by such an apparatus.

Depending on specific implementation requirements, embodiments of the invention may be implemented in hardware or software. The implementation may be enabled by using a digital memory medium, for example, a floppy disk, a DVD, a Blue-ray disc, a CD, a ROM, a PROM, an EPROM, an EEPROM or a FLASH memory, a hard drive or any other magnetic or optical memory on which electronically readable control signals are stored, such that these signals do or may interact with a programmable computer system in such a way that the respective method is implemented. The digital memory medium may therefore be computer readable.

Many embodiments according to the invention thus comprise a data medium having electronically readable control signals capable of interacting with the programmable computer system in such a way that one of the methods described herein is implemented.

In general, embodiments of the present invention may be implemented as a computer program product having a program code, wherein the program code is effective in performing one of the methods when the computer program product is running on a computer.

The program code may be stored on a machine-readable carrier, for example.

Other embodiments comprise the computer program for performing the methods described herein, wherein the computer program is stored on a machine-readable carrier.

In other words, one embodiment of the method according to the invention is thus a computer program having a program code for performing one of the methods described herein when the computer program is running on a computer.

Another embodiment of the method according to the invention is thus a data medium (or a digital memory medium or a computer-readable medium) on which the computer program is recorded for implementing one of the methods described herein.

Another embodiment of the method according to the invention is thus a data stream or a sequence of signals representing the computer program for implementing one of the methods described herein. The data stream of the sequence of signals may be configured to be transferred over a data communication link, e.g., over the Internet.

Another embodiment comprises a processing unit, for example, a computer or a programmable logic module that is configured or adapted to perform one of the methods described herein.

Another embodiment comprises a computer on which the computer program is installed for performing one of the methods described herein.

Another embodiment according to the invention comprises a device or a system designed to transfer to a receiver a computer program for implementing at least one of the methods described herein. The transmission may take place electronically or optically, for example. The receiver may be, for example, a computer, a mobile device, a memory device or a similar device. The device or the system may comprise, for example, a file server for transferring the computer program to the receiver.

In many embodiments, a programmable logic module (for example, a field programmable gate array, FPGA) may be used to implement some or all functionalities of the methods described herein. In many embodiments, a field programmable gate array may cooperate with a microprocessor to implement one of the methods described herein. In general, the methods in some embodiments are performed by any hardware device. This may be a universally usable hardware such as a computer processor (CPU) or specific hardware for the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A transmitter for sending data packets over a time-multiplexed channel, the transmitter belonging to a self-organizing network having a plurality of hierarchy layers for a plurality of transmitters, wherein transmitters on one hierarchy layer of the plurality of hierarchy layers use only time slots that are provided for the one hierarchy layer, the transmitter comprising:
   a time slot selector configured to select a time slot for sending a data packet on the basis of time slot information;
   a data packet position selector configured to select a data packet time position within the selected time slot, wherein the data packet time position is selected anew for at least every $i^{th}$ data packet; and
   a reception unit configured to receive at least one item of the time slot information from a receiver configured to receive the data packet, wherein the one hierarchy layer and the time slots provided for the one hierarchy layer are determined based on information received from precursor transmitters or neighboring transmitters by the receiver; wherein
   the transmitter is configured to send the data packet in the selected time slot and at the selected data packet time position within the selected time slot; and
   the time slot selector is configured to check whether a selection of another time slot may be used for sending future data packets and to initiate the selection of the another time slot if the transmitter is competing with at least one other transmitter for the time slot.

2. The transmitter according to claim 1, additionally comprising a random generator connected to the data packet position selector configured to randomly select the new data packet time position.

3. The transmitter according to claim 1, wherein a new data packet time position is determined for each data packet.

4. The transmitter according to claim 1, wherein the transmitter is additionally configured to insert an item of data packet time position information into the data packet indicating the data packet time position at which the packet is sent.

5. A receiver for receiving data packets over a time-multiplexed channel, the receiver comprising:
   a time slot analyzer configured to check whether during a time slot of a current frame or during at least one corresponding time slot of a preceding frame, data packets from more than one transmitter have been received, the more than one transmitter belonging to a self-organizing network having a plurality of hierarchy layers for a plurality of transmitters, wherein transmitters on one hierarchy layer of the plurality of hierarchy layers use only time slots that are provided for the one hierarchy layer;
   wherein the one hierarchy layer and the time slots provided for the one hierarchy layer are determined based on information received from precursor transmitters or neighboring transmitters by the receiver;
   wherein the time slot and the at least one corresponding time slot of the at least one preceding frame are subdivided, so that a data packet within the time slot or the corresponding time slot may be present at one of at least two different data packet time positions;
   a time slot information generator configured to generate time slot information indicating whether the time slot or the corresponding time slot of at least one of the preceding frames comprises the data packets from the more than one transmitter;
   a time slot information transmitter configured to transmit the time slot information to at least one of a first transmitter which has sent a current data packet and a second transmitter to which the same time slot as the first transmitter has been allocated based on a time slot schedule if the first transmitter sending the current data packet and the second transmitter are using the same time slot, or the same time slot is being used by at least one preceding frame for sending packets.

6. The receiver according to claim 5, wherein the time slot analyzer is additionally configured to check on whether an expected data packet was received within an expected time slot, and if the expected data packet fails to appear, to generate information about a possible collision, and wherein the time slot information generator is additionally configured to insert into the time slot information the information about a possible collision of two or more data packets within the expected time slot.

7. The receiver according to claim 5, wherein the time slot information transmitter is configured to send the time slot information to a transmitter that is eligible due to the time slot schedule and comes before at least one other transmitter to which, according to a classification criterion indicative for a node of the network or a transmitter, the same time slot has been allocated on the basis of the time slot schedule.

8. The receiver according to claim 5, additionally comprising a reception statistics calculator for successfully received data packets at at least two different data packet time positions of a time slot;
   wherein the time slot information generator is additionally configured to compare a difference in the reception statistics for the at least two different data packet time positions with a threshold value and to insert information about a possible sliding collision into the time slot information in the event the threshold value is exceeded.

9. The receiver according to claim 5, additionally comprising a synchronization device configured to synchronize a time slot control of the receiver by means of the received data packet.

10. A method for sending data packets over a time-multiplexed channel using a transmitter, the transmitter belonging to a self-organizing network having a plurality of hierarchy layers for a plurality of transmitters, wherein transmitters on one hierarchy layer of the plurality of hierarchy layers use only time slots that are provided for the one hierarchy layer, the method comprising:
 selecting a time slot for sending a data packet;
 selecting a data packet time position within the selected time slot, wherein the data packet time position is selected anew for at least every $i^{th}$ data packet to be sent;
 sending the data packet during the selected time slot and at the selected data packet time position within the selected time slot;
 receiving time slot information from at least one receiver that has received the data packet sent, wherein the one hierarchy layer and the time slots provided for the one hierarchy layer are determined based on information received from precursor transmitters or neighboring transmitters by the at least one receiver;
 checking whether to select another time slot for transmitting future data packets based on the time slot information; and
 initiating the selection of the another time slot if a transmitter is competing with at least one other transmitter for the time slot; wherein
 the transmitter is assigned to the time-multiplexed channel during the another time slot according to a time slot schedule.

11. The method according to claim 10, wherein the selection of the data packet time position is random.

12. The method according to any one of claim 10, wherein a new data packet time position is selected for each data packet.

13. The method according to claim 10, additionally comprising:
 inserting an item of data packet time position information into the data packet, indicating in which the data packet time position the packet is sent.

14. A method for receiving data packets over a time-multiplexed channel from a transmitter, the transmitter belonging to a self-organizing network having a plurality of hierarchy layers for a plurality of transmitters, wherein transmitters on one hierarchy layer of the plurality of hierarchy layers use only time slots that are provided for the one hierarchy layer, the method comprising:
 receiving a data packet during a time slot which has been assigned to the transmitter sending the data packet, wherein the time slot is subdivided, so that a data packet within the time slot may occur at one of at least two different data packet time positions;
 checking whether a data packet was received within the time slot or within a corresponding time slot of at least one preceding frame, said packet having been sent by a different transmitter than the current data packet;
 transmitting time slot information to at least one of a first transmitter which has sent a current data packet and a second transmitter to which the same time slot as the first transmitter has been allocated based on a time slot schedule if the first transmitter sending the current data packet and the second transmitter are using the same time slot, or the same time slot is being used by the at least one preceding frame for sending data packets;
 wherein the one hierarchy layer and the time slots provided for the one hierarchy layer are determined based on information received from precursor transmitters or neighboring transmitters by a receiver.

15. The method according to claim 14, additionally comprising:
 checking on whether an expected data packet was received within an expected time slot;
 generating information about a possible collision if the expected data packet has failed to appear;
 transmitting the information about the possible collision.

16. The method according to claim 14, additionally comprising:
 transmitting time slot information to at least one of: the transmitter sending the current data packet and the at least one other transmitter.

17. The method according to claim 16, additionally comprising:
 transmitting time slot information to the transmitter which comes before other ones of the plurality of transmitters according to the classification criterion indicative of a node of the network or a transmitter.

18. The method according to claim 14, additionally comprising:
 ascertaining whether reception statistics for at least two different data packet time positions of a time slot differ;
 transmitting information about a possible sliding collision when it has been ascertained that the reception statistics for the at least two different data packet time positions differ.

19. The method according to claim 14, additionally comprising:
 synchronization of a time slot control by means of the received data packet.

20. A non-transitory computer-readable medium including a computer program comprising a program code for implementing, when the computer program is running on a computer, a microcontroller or a microprocessor, a method for sending data packets over a time-multiplexed channel using a transmitter, the transmitter belonging to a self-organizing network having a plurality of hierarchy layers for a plurality of transmitters, wherein transmitters on one hierarchy layer of the plurality of hierarchy layers use only time slots that are provided for the one hierarchy layer, the method comprising:
 selecting a time slot for sending a data packet;
 selecting a data packet time position within the selected time slot, wherein the data packet time position is selected anew for at least every $i^{th}$ data packet to be sent; and
 sending the data packet during the selected time slot and at the selected data packet time position within the selected time slot;
 receiving time slot information from at least one receiver that has received the data packet sent, wherein the one hierarchy layer and the time slots provided for the one hierarchy layer are determined based on information received from precursor transmitters or neighboring transmitters by the at least one receiver;
 checking whether to select another time slot for transmitting future data packets; and
 initiating the selection of the another time slot if a transmitter is competing with at least one other transmitter for the time slot; wherein
 the transmitter is assigned to the time-multiplexed channel during the another time slot according to a time slot schedule.

21. A non-transitory computer-readable medium including a computer program comprising a program code for implementing, when the computer program is running on a computer, a microcontroller or a microprocessor, a method for receiving data packets over a time-multiplexed channel from a transmitter, the transmitter belonging to a self-organizing network having a plurality of hierarchy layers for a plurality of transmitters, wherein transmitters on one hierarchy layer of the plurality of hierarchy layers use only time slots that are provided for the one hierarchy layer, the method comprising:
   receiving a data packet during a time slot which has been assigned to the transmitter sending the data packet, wherein the time slot is subdivided, so that a data packet within the time slot may occur at one of at least two different data packet time positions;
   checking whether a data packet was received within the time slot or within a corresponding time slot of at least one preceding frame, said packet having been sent by a different transmitter than the current data packet;
   transmitting time slot information to at least one of a first transmitter which has sent a current data packet and a second transmitter to which the same time slot as the first transmitter has been allocated based on a time slot schedule if the first transmitter sending the current data packet and the second transmitter are using the same time slot, or the same time slot is being used by the at least one preceding frame for sending data packets;
   wherein the one hierarchy layer and the time slots provided for the one hierarchy layer are determined based on information received from precursor transmitters or neighboring transmitters by a receiver.

22. The method according to claim 11, wherein a new data packet time position is selected for each data packet.

23. A sensor network comprising:
   at least one transmitter for sending data packets over a time-multiplexed channel, the at least one transmitter belonging to a self-organizing network having a plurality of hierarchy layers for a plurality of transmitters, wherein transmitters on one hierarchy layer of the plurality of hierarchy layers use only time slots that are provided for the one hierarchy layer, the at least one transmitter including:
   a time slot selector configured to select a time slot for sending a data packet on the basis of time slot information; and
   a reception unit configured to receive at least one item of the time slot information from a receiver configured to receive the data packet; wherein
   the at least one transmitter is configured to send the data packet in the selected time slot and at the selected data packet time position within the selected time slot; and
   a receiver configured to receive data packets over the time-multiplexed channel, the receiver including:
   a time slot analyzer configured to check whether during a time slot of a current frame or during at least one corresponding time slot of a preceding frame, data packets from more than one transmitter have been received, wherein the time slot and the at least one corresponding time slot of the at least one preceding frame are subdivided, so that a data packet within the time slot or the corresponding time slot may be present at one of at least two different data packet time positions;
   a time slot information generator configured to generate time slot information indicating whether the time slot or the corresponding time slot of at least one of the preceding frames comprises the data packets from the more than one transmitter; and
   a time slot information transmitter configured to transmit the time slot information; wherein
   the one hierarchy layer and the time slots provided for the one hierarchy layer are determined based on information received from precursor transmitters or neighboring transmitters by the receiver.

* * * * *